(12) United States Patent
Yoo et al.

(10) Patent No.: US 11,979,608 B2
(45) Date of Patent: May 7, 2024

(54) TRANSFORM COEFFICIENT CODING METHOD AND DEVICE

(71) Applicant: LG Electronics Inc., Seoul (KR)

(72) Inventors: Sunmi Yoo, Seoul (KR); Seunghwan Kim, Seoul (KR); Jungah Choi, Seoul (KR); Ling Li, Seoul (KR); Jangwon Choi, Seoul (KR); Jin Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/283,906

(22) PCT Filed: Oct. 7, 2019

(86) PCT No.: PCT/KR2019/013105
§ 371 (c)(1),
(2) Date: Apr. 8, 2021

(87) PCT Pub. No.: WO2020/076028
PCT Pub. Date: Apr. 16, 2020

(65) Prior Publication Data
US 2022/0014787 A1 Jan. 13, 2022

Related U.S. Application Data

(60) Provisional application No. 62/744,616, filed on Oct. 11, 2018.

(51) Int. Cl.
*H04N 11/02* (2006.01)
*H04N 19/12* (2014.01)
(Continued)

(52) U.S. Cl.
CPC ............. *H04N 19/60* (2014.11); *H04N 19/12* (2014.11); *H04N 19/124* (2014.11);
(Continued)

(58) Field of Classification Search
CPC ...... H04N 19/60; H04N 19/12; H04N 19/124; H04N 19/132; H04N 19/176; H04N 19/18
(Continued)

(56) References Cited

U.S. PATENT DOCUMENTS 6,040,863 A 3/2000 Kato
2010/0033594 A1 2/2010 Maruyama
(Continued)

FOREIGN PATENT DOCUMENTS

CN 104038763 9/2014
CN 104683811 6/2015
(Continued)

OTHER PUBLICATIONS

Office Action in Chinese Appln. No. 201980072715.9, dated Apr. 20, 2023, 16 pages(with English translation).

*Primary Examiner* — Jayanti K Patel
*Assistant Examiner* — Richard B Carter
(74) *Attorney, Agent, or Firm* — Fish & Richardson P.C.

(57) ABSTRACT

An image decoding method according to the present document comprises the steps of: receiving a bitstream including residual information; deriving a quantized transform coefficient for a current block on the basis of the residual information included in the bitstream; deriving a residual sample for the current block on the basis of the quantized transform coefficient; and generating a restoration picture on the basis of the residual sample for the current block, wherein the residual information includes position information for indicating the position of a transform coefficient,
(Continued)

which is not the last 0 in a transform block, and the position information can be derived if a transform skip is not applied to the transform block.

8 Claims, 19 Drawing Sheets

(51) Int. Cl.
  *H04N 19/124* (2014.01)
  *H04N 19/132* (2014.01)
  *H04N 19/176* (2014.01)
  *H04N 19/18* (2014.01)
  *H04N 19/60* (2014.01)

(52) U.S. Cl.
  CPC ......... *H04N 19/132* (2014.11); *H04N 19/176* (2014.11); *H04N 19/18* (2014.11)

(58) Field of Classification Search
  USPC ........................................ 375/240.18, 240.12
  See application file for complete search history.

(56) References Cited

U.S. PATENT DOCUMENTS

| | | | | |
|---|---|---|---|---|
| 2011/0096834 A1* | 4/2011 | Cheon | ................... | H04N 19/46 |
| | | | | 375/E7.243 |
| 2013/0114730 A1* | 5/2013 | Joshi | ..................... | H04N 19/156 |
| | | | | 375/240.18 |
| 2016/0227253 A1* | 8/2016 | Sato | ....................... | H04N 19/12 |
| 2018/0176588 A1* | 6/2018 | Alshina | ................ | H04N 19/186 |
| 2018/0213258 A1* | 7/2018 | Xu | .......................... | H04N 19/13 |
| 2018/0288409 A1 | 10/2018 | Heo et al. | | |
| 2020/0020134 A1* | 1/2020 | Tsukuba | ............... | H04N 19/117 |
| 2021/0235119 A1* | 7/2021 | Kim | ....................... | H04N 19/12 |

FOREIGN PATENT DOCUMENTS

| | | |
|---|---|---|
| CN | 105872549 | 8/2016 |
| JP | 2018078647 | 5/2018 |
| KR | 1020180013911 | 2/2018 |
| KR | 1020180048739 | 5/2018 |
| WO | WO2013107908 | 7/2013 |
| WO | WO2014071439 | 5/2014 |
| WO | WO 2017/057953 | 4/2017 |

\* cited by examiner

TRANSFORM COEFFICIENT CODING METHOD AND DEVICE

CROSS-REFERENCE TO RELATED APPLICATIONS

This application is a National Stage application under 35 U.S.C. § 371 of International Application No. PCT/KR2019/013105, filed on Oct. 7, 2019, which claims the benefit of U.S. Provisional Application No. 62/744,616 filed on Oct. 11, 2018. The disclosures of the prior applications are incorporated by reference in their entirety.

BACKGROUND OF THE DISCLOSURE

Field of the Disclosure

The present disclosure relates generally to image coding technology and, more particularly, to a method and apparatus for coding a transform coefficient.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

The present disclosure is to provide a method and apparatus for improving image coding efficiency.

The present disclosure is also to provide a method and apparatus for improving efficiency of residual coding.

The present disclosure is also to provide a method and apparatus for improving the efficiency of residual coding according to whether or not transform skip is applied.

According to an embodiment of the present disclosure, there is provided an image decoding method performed by a decoding apparatus, the method including: receiving a bitstream including residual information; deriving a quantized transform coefficient for a current block based on the residual information included in the bitstream; deriving a residual sample for the current block based on the quantized transform coefficient; and generating a reconstructed picture based on the residual sample for the current block, wherein the residual information includes position information related to the position of the last non-zero transform coefficient in a transform block, and wherein the position information is derived when a transform skip is not applied to the transform block.

According to another embodiment of the present disclosure, there is provided an image encoding method by an encoding apparatus, the method including: deriving a residual sample for a current block; deriving a quantized transform coefficient based on the residual sample for the current block; and encoding residual information including information on the quantized transform coefficient, wherein the residual information includes position information related to the position of the last non-zero transform coefficient in a transform block, and wherein the position information is derived when a transform skip is not applied to the transform block.

According to still another embodiment of the present disclosure, an image decoding apparatus for performing an image decoding method includes: an entropy decoder which receives a bitstream including residual information, and derives a quantized transform coefficient for a current block based on the residual information included in the bitstream; an inverse transformer which derives a residual sample for the current block based on the quantized transform coefficient; and an adder which generates a reconstructed picture based on the residual sample for the current block, wherein the residual information includes position information related to the position of the last non-zero transform coefficient in a transform block, and wherein the position information is derived when a transform skip is not applied to the transform block.

According to still another embodiment of the present disclosure, there is provided an encoding apparatus for performing image encoding. The encoding apparatus includes a subtractor which derives a residual sample for a current block, a quantizer which derives a quantized transform coefficient based on the residual sample for the current block; and an entropy encoder which encodes residual information including information on the quantized transform coefficient, wherein the residual information includes position information related to the position of the last non-zero transform coefficient in a transform block, and wherein the position information is derived when a transform skip is not applied to the transform block.

According to still another embodiment of the present disclosure, a digital storage medium in which image data including encoded image information generated according to the image encoding method performed by an encoding apparatus is stored may be provided.

According to still another embodiment of the present disclosure, a digital storage medium in which image data including encoded image information causing the decoding apparatus to perform the image decoding method is stored may be provided.

According to an embodiment of the present disclosure, it is possible to improve general image/video compression efficiency.

According to an embodiment of the present disclosure, it is possible to improve the efficiency of residual coding.

According to the present disclosure, it is possible to improve the efficiency of transform coefficient coding.

According to the present disclosure, it is possible to improve the efficiency of residual coding according to whether or not transform skip is applied.

DESCRIPTION OF EMBODIMENTS

Figure 1:
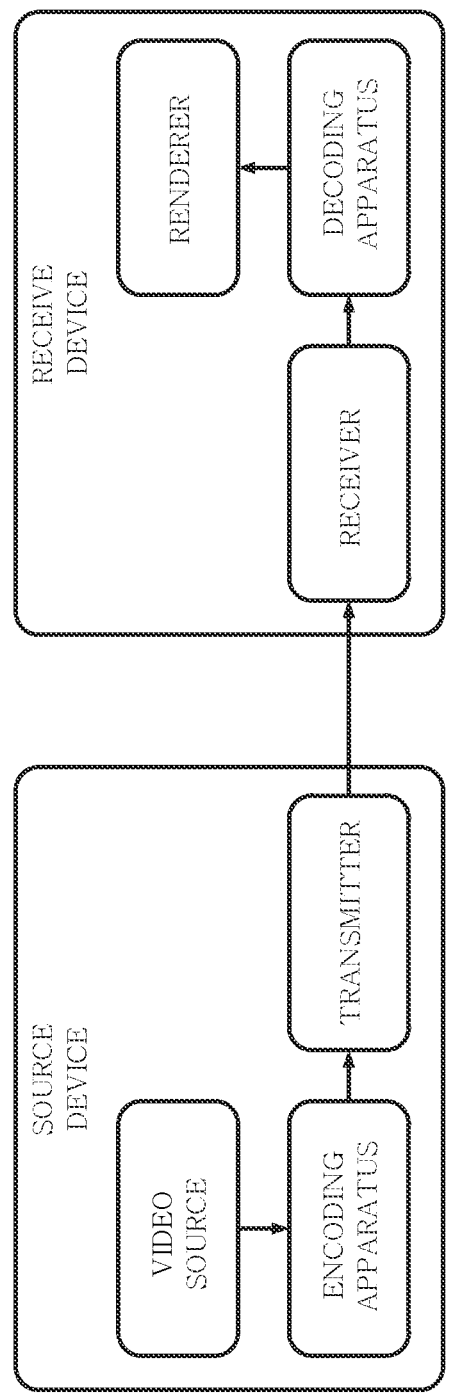
FIG. 1 schematically represents an example of a video/image coding system to which the present disclosure may be applied.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present document as long as they do not depart from the essence of the present document.

Hereinafter, examples of the present embodiment will be described in detail with reference to the accompanying drawings. In addition, like reference numerals are used to indicate like elements throughout the drawings, and the same descriptions on the like elements will be omitted.

FIG. 1 illustrates an example of a video/image coding system to which the present disclosure may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, a method/embodiment disclosed in this document may be applied to a method disclosed in the versatile video coding (VVC) standard, the essential video coding (EVC) standard, the AOMedia Video 1 (AV1) standard, the 2nd generation of audio video coding standard (AVS2) or the next generation video/image coding standard (e.g., H.267, H.268, or the like).

This document suggests various embodiments of video/image coding, and the above embodiments may also be performed in combination with each other unless otherwise specified.

In this document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture (a brick may represent a rectangular region of CTU rows within a tile in a picture). A tile may be partitioned into a multiple bricks, each of which may be constructed with one or more CTU rows within the tile (A tile may be partitioned into multiple bricks, each of which consisting of one or more CTU rows within the tile). A tile that is not partitioned into multiple bricks may also be referred to as a brick. A brick scan may represent a specific sequential ordering of CTUs partitioning a picture, wherein the CTUs may be ordered in a CTU raster scan within a brick, and bricks within a tile may be ordered consecutively in a raster scan of the bricks of the tile, and tiles in a picture may be ordered consecutively in a raster scan of the tiles of the picture (A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture). A tile is a particular tile column and a rectangular region of CTUs within a particular tile column (A tile is a rectangular region of CTUs within a particular tile column and a particular tile row in a picture). The tile column is a rectangular region of CTUs, which has a height equal to the height of the picture and a width that may be specified by syntax elements in the picture parameter set (The tile column is a rectangular region of CTUs having a height equal to the height of the picture and a width specified by syntax elements in the picture parameter set). The tile row is a rectangular region of CTUs, which has a width specified by syntax elements in the picture parameter set and a height that may be equal to the height of the picture (The tile row is a rectangular region of CTUs having a height specified by syntax elements in the picture parameter set and a width equal to the width of the picture). A tile scan may represent a specific sequential ordering of CTUs partitioning a picture, and the CTUs may be ordered consecutively in a CTU raster scan in a tile, and tiles in a picture may be ordered consecutively in a raster scan of the tiles of the picture (A tile scan is a specific sequential ordering of CTUs partitioning a picture in which the CTUs are ordered consecutively in CTU raster scan in a tile whereas tiles in a picture are ordered consecutively in a raster scan of the tiles of the picture). A slice may include an integer number of bricks of a picture, and the integer number of bricks may be included in a single NAL unit (A slice includes an integer number of bricks of a picture that may be exclusively contained in a single NAL unit). A slice may be constructed with multiple complete tiles, or may be a consecutive sequence of complete bricks of one tile (A slice may consists of either a number of complete tiles or only a consecutive sequence of complete bricks of one tile). In this document, a tile group and a slice may be used in place of each other. For example, in this document, a tile group/tile group header may be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex, cb, cr) blocks. The unit may be used interchangeably with terms such as block or area in some cases. In a general case, an M×N block may include samples (or sample arrays) or a set (or array) of transform coefficients of M columns and N rows.

In this document, the symbol "/" and "," should be interpreted as "and/or." For example, the expression "A/B" is interpreted as "A and/or B", and the expression "A, B" is interpreted as "A and/or B." Additionally, the expression "A/B/C" means "at least one of A, B, and/or C." Further, the expression "A, B, C" also means "at least one of A, B, and/or C." (In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C.")

Additionally, in the present document, the term "or" should be interpreted as "and/or." For example, the expression "A or B" may mean 1) only "A", 2) only "B", and/or 3) "both A and B." In other words, the term "or" in the present document may mean "additionally or alternatively." (Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively.")

Figure 2:
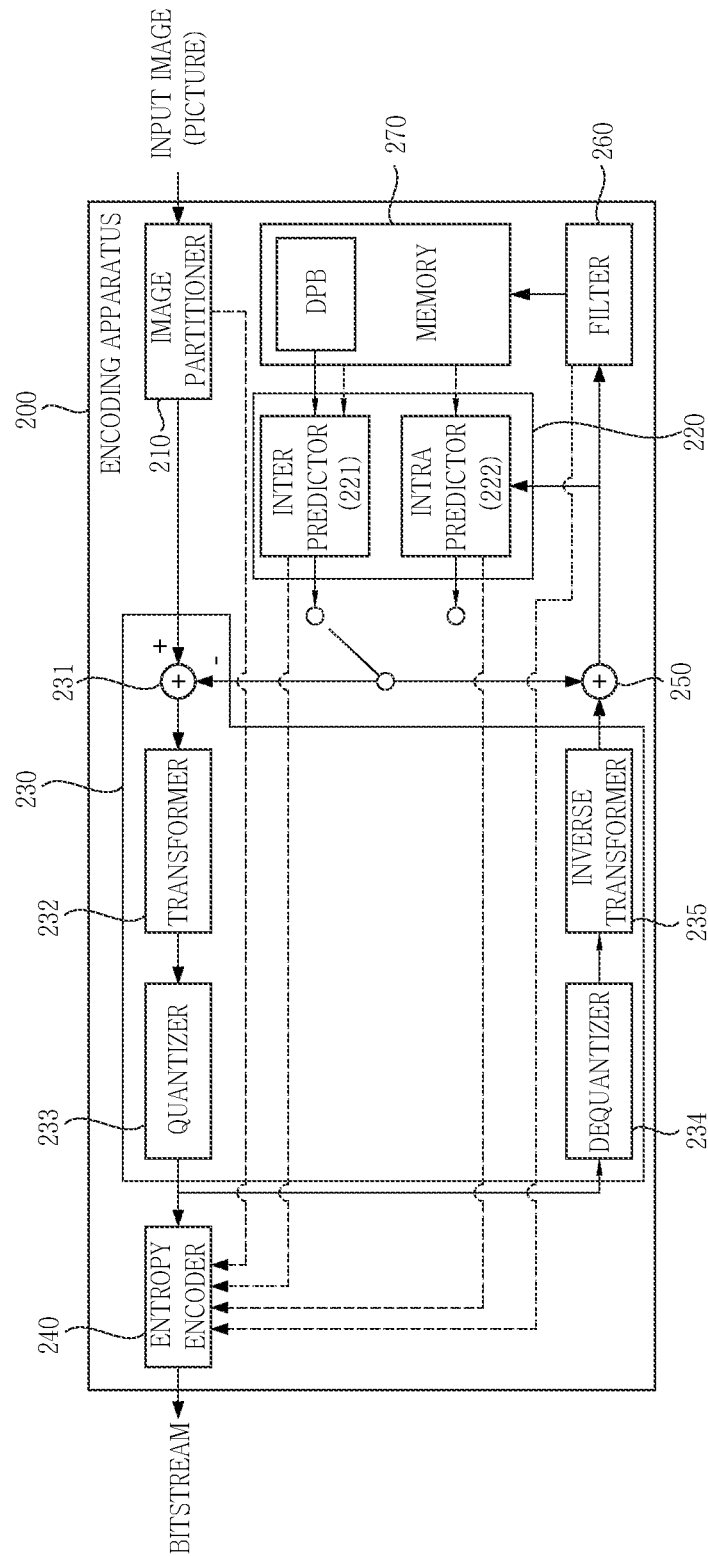
FIG. 2 is a diagram schematically illustrating a configuration of a video/image encoding apparatus to which the present disclosure may be applied.

FIG. 2 is a diagram schematically illustrating a configuration of a video/image encoding apparatus to which the present document may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/ video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The predicted signal generated through the predictor (including the inter predictor 221 and/or the intra predictor 222) may be used to generate a reconstructed signal or used to generate a residual signal. The transformer 232 may generate transform coefficients by applying the transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in this document may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
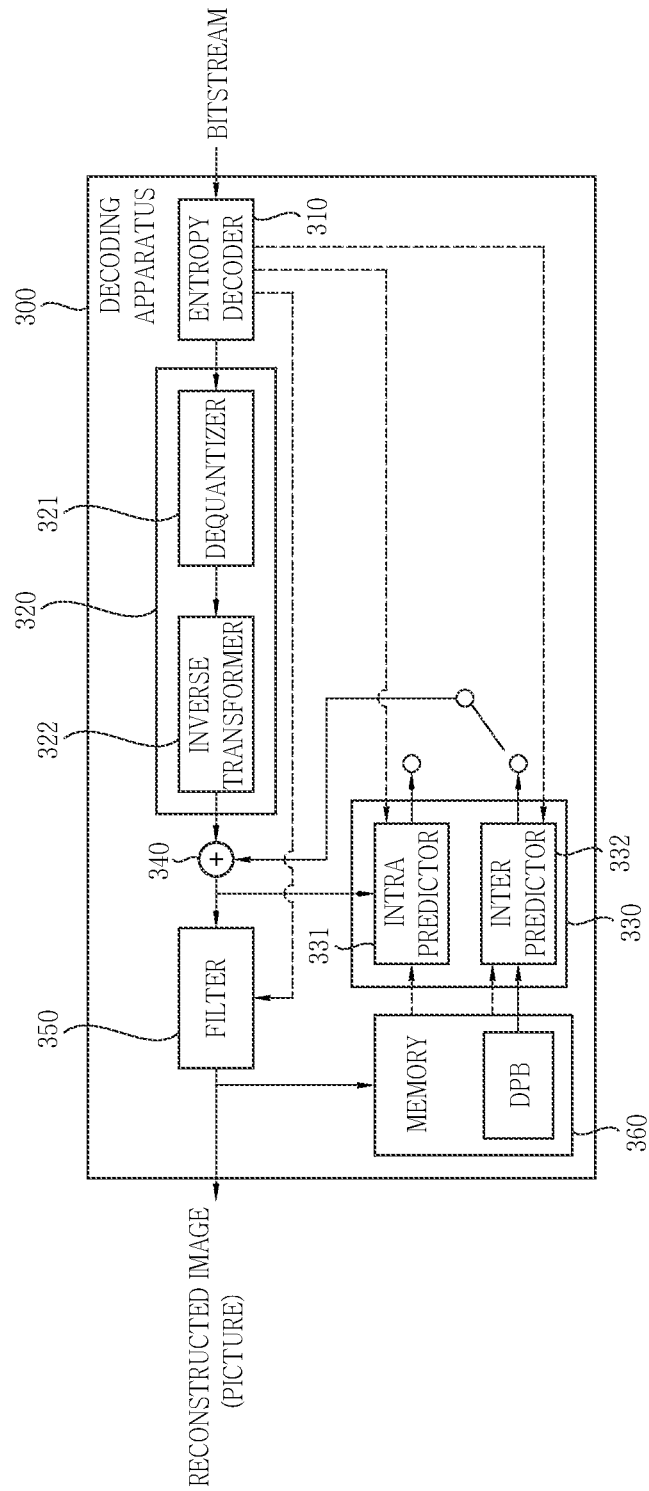
FIG. 3 is a diagram schematically illustrating a configuration of a video/image decoding apparatus to which the present disclosure may be applied.

FIG. 3 is a diagram for schematically explaining a configuration of a video/image decoding apparatus to which the present disclosure is applicable.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in this document may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to this document may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present specification, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Figure 4:
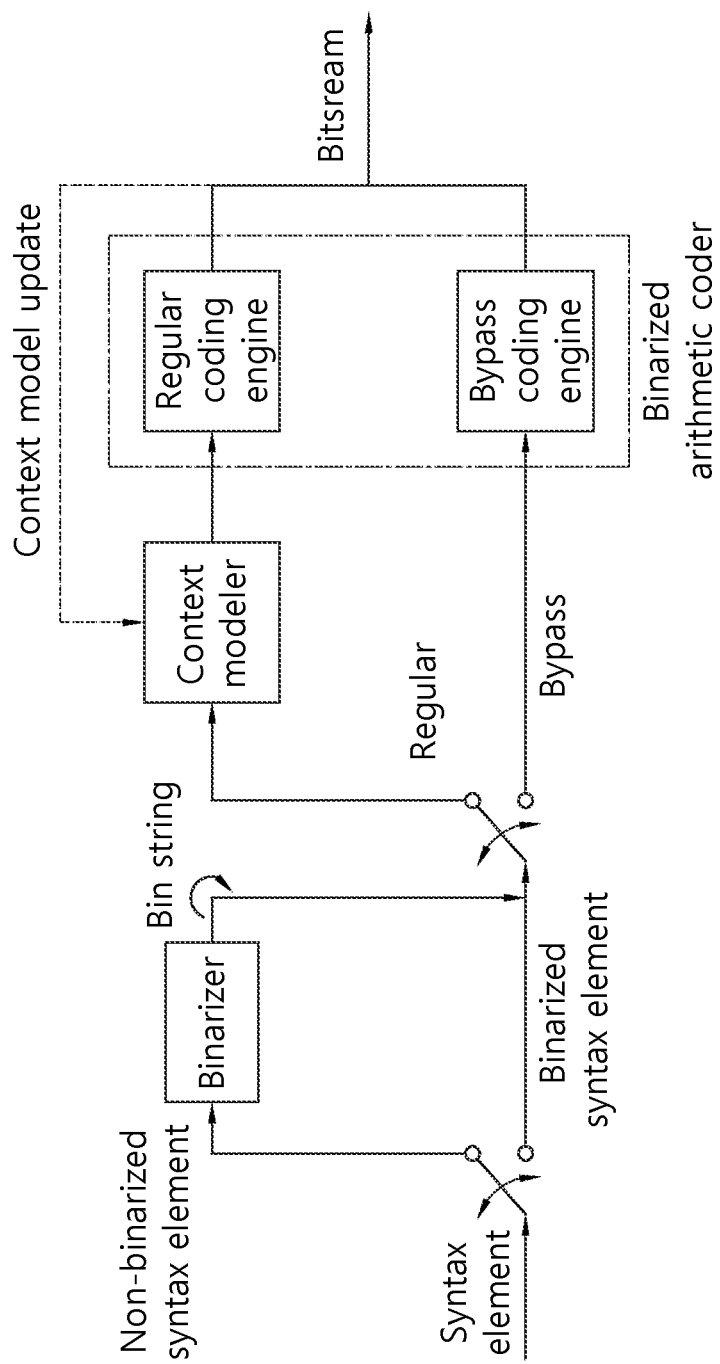
FIG. 4 is a diagram illustrating a block diagram of a CABAC encoding system according to an embodiment.

FIG. 4 shows a block diagram of context-adaptive binary arithmetic coding (CABAC) for encoding a single syntax element, as a diagram illustrating a block diagram of a CABAC encoding system according to an embodiment.

In a case where an input signal is a non-binarized syntax element, an encoding process of the CABAC first converts the input signal into a binarized value through binarization. In a case where an input signal is already a binarized value, the input signal bypasses the binarization without being subject to it, and input to an encoding engine. Here, each binary number 0 or 1 constituting the binary value is referred to as a bin. For example, in a case where a binary string after the binarization is '110', each of 1, 1, and 0 is referred to as a bin. The bin(s) for a syntax element may be a value of the syntax element.

Binarized bins are input to a regular encoding engine or a bypass encoding engine.

The regular encoding engine assigns to a corresponding bin a context model reflecting a probability value, and encodes the bin based on the assigned context model. After performing the encoding on each bin, the regular encoding engine may update a probability model for the bin. The thus encoded bins are referred to as context-coded bins.

The bypass encoding engine omits a process of estimating a probability for an input bin, and a process of updating the probability model which has been applied to the bin, after the encoding. The bypass encoding engine improves an encoding speed by encoding bins being input thereto while applying uniform probability distribution instead of assigning a context. The thus encoded bins are referred to as bypass bins.

The entropy encoding may determine whether to perform the encoding through the regular encoding engine or through the bypass encoding engine, and switch an encoding path. The entropy decoding performs the same processes as those of the encoding in a reverse order.

Meanwhile, in an embodiment, a (quantized) transform coefficient is encoded and/or decoded based on syntax elements, such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, par_level_flag, rem_abs_gt1_flag, rem_abs_gt2_flag, abs_remainder, coeff_sign_flag, mts_jdx and the like. Table 1 below shows syntax elements related to the residual data encoding according to an example.

TABLE 1

| | Descriptor |
|---|---|
| residual_coding( x0, y0, log2TbWidth, log2TbHeight, cIdx ) { | |
|   if( transform_skip_enabled_flag && ( cIdx != 0 \|\| cu_mts_flag[ x0 ][ y0 ] = = 0 ) && | |
|     ( log2TbWidth <= 2 ) && ( log2TbHeight <= 2 ) ) | |
|     transform_skip_flag[ x0 ][ y0 ][ cIdx ] | ae(v) |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2SbSize = ( Min( log2TbWidth, log2TbHeight ) < 2 ? 1 : 2 ) | |
|   numSbCoeff = 1 << ( log2SbSize << 1 ) | |
|   lastScanPos = numSbCoeff | |
|   lastSubBlock = ( 1 << ( log2TbWidth + log2TbHeight − 2 * log2SbSize ) ) − 1 | |
|   do { | |
|     if( lastScanPos = = 0 ) { | |
|       lastScanPos = numSbCoeff | |
|       lastSubBlock− − | |
|     } | |
|     lastScanPos− − | |
|     xS = DiagScanOrder[ log2TbWidth − log2SbSize ][ log2TbHeight − log2SbSize ] | |
|       [ lastSubBlock ][ 0 ] | |
|     yS = DiagScanOrder[ log2TbWidth − log2SbSize ][ log2TbHeight − log2SbSize ] | |
|       [ lastSubBlock ][ 1 ] | |
|     xC = ( xS << log2SbSize ) + | |
|       DiagScanOrder[ log2SbSize ][ log2SbSize ][ lastScanPos ][ 0 ] | |
|     yC = ( yS << log2SbSize ) + | |
|       DiagScanOrder[ log2SbSize ][ log2SbSize ][ lastScanPos ][ 1 ] | |
|   } while( ( xC != LastSignificantCoeffX ) \|\| ( yC != LastSignificantCoeffY ) ) | |
|   QState = 0 | |
|   for( i = lastSubBlock; i >= 0; i− − ) { | |
|     startQStateSb = QState | |
|     xS = DiagScanOrder[ log2TbWidth − log2SbSize ][ log2TbHeight − log2SbSize ] | |
|       [ lastSubBlock ][ 0 ] | |
|     yS = DiagScanOrder[ log2TbWidth − log2SbSize ][ log2TbHeight − log2SbSize ] | |
|       [ lastSubBlock ][ 1 ] | |
|     inferSbDcSigCoeffFlag = 0 | |
|     if( ( i < lastSubBlock ) && ( i > 0 ) ) { | |
|       coded_sub_block_flag[ xS ][ yS ] | ae(v) |
|       inferSbDcSigCoeffFlag = 1 | |
|     } | |
|     firstSigScanPosSb = numSbCoeff | |
|     lastSigScanPosSb = −1 | |
|     for( n = ( i = = lastSubBlock ) ? lastScanPos − 1 : numSbCoeff − 1; n >= 0; n− − ) | |
|     { | |
|       xC = ( xS << log2SbSize ) + DiagScanOrder[ log2SbSize ][ log2SbSize ][ n ][ 0 ] | |
|       yC = ( yS << log2SbSize ) + DiagScanOrder[ log2SbSize ][ log2SbSize ][ n ][ 1 ] | |
|       if( coded_sub_block_flag[ xS ][ yS ] && ( n > 0 \|\| !inferSbDcSigCoeffFlag ) ) | |
|     { | |
|       sig_coeff_flag[ xC ][ yC ] | ae(v) |
|     } | |
|     if( sig_coeff_flag[ xC ][ yC ] ) { | |
|       par_level_flag[ n ] | ae(v) |
|       rem_abs_gt1_flag[ n ] | ae(v) |
|       if( lastSigScanPosSb = = −1 ) | |
|         lastSigScanPosSb = n | |
|       firstSigScanPosSb = n | |

TABLE 1-continued

Descriptor

```
            }
            AbsLevelPass1[ xC ][ yC ] =
                    sig_coeff_flag[ xC ][ yC ] + par_level_flag[ n ] + 2 * rem_abs_gt1_flag[ n ]
            if( dep_quant_enabled_flag )
                    QState = QStateTransTable[ QState ][ par_level_flag[ n ] ]
        }
        for( n = numSbCoeff − 1; n >= 0; n− − ) {
            if( rem_abs_gt1_flag[ n ] )
                    rem_abs_gt2_flag[ n ]                                                                     ae(v)
        }
        for( n = numSbCoeff − 1; n >= 0; n− − ) {
            xC = ( xS << log2SbSize ) + DiagScanOrder[ log2SbSize ][ log2SbSize ][ n ][ 0 ]
            yC = ( yS << log2SbSize ) + DiagScanOrder[ log2SbSize ][ log2SbSize ][ n ][ 1 ]
            if( rem_abs_gt2_flag[ n ] )
                    abs_remainder[ n ]
            AbsLevel[ xC ][ yC ] = AbsLevelPass1[ xC ][ yC ] +
                                    2 * ( rem_abs_gt2_flag[ n ] + abs_remainder[ n ] )
        }
        if( dep_quant_enabled_flag || !sign_data_hiding_enabled_flag )
            signHidden = 0
        else
            signHidden = ( lastSigScanPosSb − firstSigScanPosSb > 3 ? 1 : 0 )
        for( n = numSbCoeff − 1; n >= 0; n− − ) {
            xC = ( xS << log2SbSize ) + DiagScanOrder[ log2SbSize ][ log2SbSize ][ n ][ 0 ]
            yC = ( yS << log2SbSize ) + DiagScanOrder[ log2SbSize ][ log2SbSize ][ n ][ 1 ]
            if( sig_coeff_flag[ xC ][ yC ] &&
                    ( !signHidden || ( n != firstSigScanPosSb ) ) )
                    coeff_sign_flag[ n ]                                                                      ae(v)
        }
        if( dep_quant_enabled_flag ) {
            QState = startQStateSb
            for( n = numSbCoeff − 1; n >= 0; n− − ) {
                xC = ( xS << log2SbSize ) +
                        DiagScanOrder[ log2SbSize ][ log2SbSize ][ n ][ 0 ]
                yC = ( yS << log2SbSize ) +
                        DiagScanOrder[ log2SbSize ][ log2SbSize ][ n ][ 1 ]
                if( sig_coeff_flag[ xC ][ yC ] )
                    TransCoeffLevel[ x0 ][ y0 ][ cIdx ][ xC ][ yC ] =
                            ( 2 * AbsLevel[ xC ][ yC ] − ( QState > 1 ? 1 : 0 ) ) *
                            ( 1 − 2 * coeff_sign_flag[ n ] )
                QState = QStateTransTable[ QState ][ par_level_flag[ n ] ]
        } else {
            sumAbsLevel = 0
            for( n = numSbCoeff − 1; n >= 0; n− − ) {
                xC = ( xS << log2SbSize ) +
                        DiagScanOrder[ log2SbSize ][ log2SbSize ][ n ][ 0 ]
                yC = ( yS << log2SbSize ) +
                        DiagScanOrder[ log2SbSize ][ log2SbSize ][ n ][ 1 ]
                if( sig_coeff_flag[ xC ][ yC ] ) {
                    TransCoeffLevel[ x0 ][ y0 ][ cIdx ][ xC ][ yC ] =
                            AbsLevel[ xC ][ yC ] * ( 1 − 2 * coeff_sign_flag[ n ] )
                    if( signHidden ) {
                        sumAbsLevel += AbsLevel[ xC ][ yC ]
                        if( ( n = = firstSigScanPosSb ) && ( sumAbsLevel % 2 ) = = 1 ) )
                            TransCoeffLevel[ x0 ][ y0 ][ cIdx ][ xC ][ yC ] =
                                −TransCoeffLevel[ x0 ][ y0 ][ cIdx ][ xC ][ yC ]
                    }
                }
            }
        }
    }
    if( cu_mts_flag[ x0 ][ y0 ] && ( cIdx = = 0 ) &&
        !transform_skip_flag[ x0 ][ y0 ][ cIdx ] &&
        ( ( CuPredMode[ x0 ][ y0 ] = = MODE_INTRA && numSigCoeff > 2 ) ||
            ( CuPredMode[ x0 ][ y0 ] = = MODE_INTER ) ) ) {
        mts_idx[ x0 ][ y0 ]                                                                                   ae(v)
}
``` transform_skip_flag indicates whether or not a transform for an associated block is skipped. The associated block may be a coding block (CB) or a transform block (TB). In connection with the transform (and the quantization) and the residual coding process, the CB and the TB may be used interchangeably. For example, as described above, residual samples for the CB may be derived, and (quantized) transform coefficients may be derived through transform and quantization on the residual samples. And through the residual coding process, information (e.g., syntax elements) efficiently indicating positions, sizes, signs or the like of the (quantized) transform coefficients may be generated and signaled. The quantized transform coefficients may be simply called transform coefficients. Generally, in a case where the CB is not greater than a maximum TB, the size of the CB may be the same as that of the TB, and in this case, a target block to be transformed (and quantized) and residual-coded may be called the CB or the TB. Meanwhile, in a case where the CB is greater than the maximum TB, the target block to be transformed (and quantized) and residual-coded may be called the TB. While, hereinafter, syntax elements related to residual coding are described by way of example as being signaled in units of a transform blocks (TBs), the TB and the coding block (CB) may be used interchangeably as described above.

In one embodiment, based on the syntax elements last_sig_coeff_x_prefix, last_sig_coeff_y_prefix, last_sig_coeff_x_suffix, and last_sig_coeff_y_suffix, the (x, y) position information of the last non-zero transform coefficient in the transform block may be encoded. More specifically, last_sig_coeff_x_prefix indicates a prefix of a column position of a last significant coefficient in a scanning order in a transform block; last_sig_coeff_y_prefix indicates a prefix of a row position of a last significant coefficient in the scanning order in the transform block; last_sig_coeff_x_suffix indicates a suffix of a column position of a last significant coefficient in the scanning order in the transform block; and last_sig_coeff_y_suffix indicates a suffix of a row position of a last significant coefficient in the scanning order in the transform block. Here, the significant coefficient may be the non-zero coefficient. The scanning order may be a right upward diagonal scanning order. Alternatively, the scanning order may be a horizontal scanning order, or a vertical scanning order. The scanning order may be determined based on whether or not the intra/inter prediction is applied to a target block (CB, or CB including TB), and/or a specific intra/inter prediction mode.

Next, after dividing a transform block into 4×4 sub-blocks, a one-bit syntax element for coded_sub_block_flag, may used for each 4×4 sub-block to indicate whether or not there is a non-zero coefficient in a current sub-block.

If the value of coded_sub_block_flag is 0, there is no more information to be transmitted, and therefore, the encoding process for the current sub-block may be terminated. Conversely, if the value of coded_sub_block_flag is 1, the encoding process for sig_coeff_flag may continue to be performed. Since the sub-block including the last non-zero coefficient does not require encoding of coded_sub_block_flag, and the sub-block including the DC information of the transform block has a high probability of including the non-zero coefficient, coded_sub_block_flag may be assumed to have a value of 1 without being encoded.

If it is determined that a non-zero coefficient exists in the current sub-block because the value of coded_sub_block_flag is 1, then, inversely, sig_coeff_flag having a binary value may be encoded according to the scan order. A 1-bit syntax element sig_coeff_flag may be encoded for each coefficient according to the scan order. If the value of the transform coefficient at the current scan position is not 0, the value of sig_coeff_flag may be 1. Here, in the case of a sub-block including the last non-zero coefficient, since sig_coeff_flag is not required to be encoded for the last non-zero coefficient, the encoding process for sig_coeff_flag may be omitted. Only when sig_coeff_flag is 1, level information encoding may be performed, and four syntax elements may be used in the level information encoding process. More specifically, each sig_coeff_flag[xC][yC] may indicate whether or not the level (value) of the corresponding transform coefficient at each transform coefficient position (xC, yC) in the current TB is non-zero. In an embodiment, the sig_coeff_flag may correspond to an example of a significant coefficient flag indicating whether or not a quantized transform coefficient is a non-zero effective coefficient.

The level value remaining after the encoding for sig_coeff_flag may be the same as in Equation 1 below. That is, the syntax element remAbsLevel indicating the level value to be encoded may be as shown in Equation 1 below. Here, coeff means an actual transform coefficient value.

$$\text{remAbsLevel} = |\text{coeff}| - 1 \quad \text{[Equation 1]}$$

Through par_level_flag, the least significant coefficient (LSB) value of remAbsLevel written in Equation 1 may be encoded as shown in Equation 2 below. Here, par_level_flag[n] may indicate a parity of a transform coefficient level (value) at a scanning position n. After par_leve_flag encoding, a transform coefficient level value remAbsLevel to be encoded may be updated as shown in Equation 3 below.

$$\text{par\_level\_flag} = \text{remAbsLevel} \& 1 \quad \text{[Equation 2]}$$

$$\text{remAbsLevel}' = \text{remAbsLevel} \gg 1 \quad \text{[Equation 3]}$$

rem_abs_gt1_flag may indicate whether or not remAbsLevel' at the corresponding scanning position n is greater than 1, and rem_abs_gt2_flag may indicate whether or not remAbsLevel' at the corresponding scanning position n is greater than 2. Encoding for abs_remainder may be performed only when rem_abs_gt2_flag is 1. When the relationship between the actual transform coefficient value coeff and each syntax element is summarized, it may be, for example, as in Equation 4 below, and Table 2 below shows examples related to Equation 4. In addition, the sign of each coefficient may be encoded using a 1-bit symbol coeff_sign_flag. |coeff| may indicate a transform coefficient level (value), and may be expressed as AbsLevel for a transform coefficient.

$$|\text{coeff}| = \text{sig\_coeff\_flag} + \text{par\_level\_flag} + 2* \\ (\text{rem\_abs\_gt1\_flag} + \text{rem\_abs\_gt2\_flag} + \text{abs\_remainder}) \quad \text{[Equation 4]}$$

In an embodiment, the par_level_flag indicates an example of a parity level flag for parity of a transform coefficient level for the quantized transform coefficient, the rem_abs_gt1_flag indicates an example of a first transform coefficient level flag for whether or not the transform coefficient level is greater than a first threshold value, and the rem_abs_gt2_flag may indicate an example of a second transform coefficient level flag for whether or not the transform coefficient level is greater than a second threshold value.

In addition, in another embodiment, rem_abs_gt2_flag may be referred to as rem_abs_gt3_flag, and in another embodiment, rem_abs_gt1_flag and rem_abs_gt2_flag may be represented based on abs_level_gtx_flag[n][j]. abs_level_gtx_flag[n][j] may be a flag indicating whether or not the absolute value of the transform coefficient level at the scanning position n (or the transform coefficient level shifted by 1 to the right) is greater than $(j \ll 1)+1$. In one example, the rem_abs_gt1_flag may perform a function which is the same and/or similar function to abs_level_gtx_flag[n][0], and the rem_abs_gt2_flag may perform a function which is the same and/or similar to abs_level_gtx_flag[n][1]. That is, the abs_level_gtx_flag[n][0] may correspond to an example of the first transform coefficient level flag, and the abs_level_gtx_flag[n][1] may correspond to an example of the second transform coefficient level flag. The $(j \ll 1)+1$ may be replaced by a predetermined threshold value, such as a first threshold value and a second threshold value, according to circumstances.

TABLE 2

| [coeff] | sig_coeff_flag | par_level_flag | rem_abs_gt1_flag | rem_abs_gt2_flag | abs_remainder |
|---|---|---|---|---|---|
| 0 | 0 | | | | |
| 1 | 1 | 0 | 0 | | |
| 2 | 1 | 1 | 0 | | |
| 3 | 1 | 0 | 1 | 0 | |
| 4 | 1 | 1 | 1 | 0 | |
| 5 | 1 | 0 | 1 | 1 | 0 |
| 6 | 1 | 1 | 1 | 1 | 0 |
| 7 | 1 | 0 | 1 | 1 | 1 |
| 8 | 1 | 1 | 1 | 1 | 1 |
| 9 | 1 | 0 | 1 | 1 | 2 |
| 10 | 1 | 1 | 1 | 1 | 2 |
| 11 | 1 | 0 | 1 | 1 | 3 |
| ... | ... | ... | ... | ... | ... |

Figure 5:
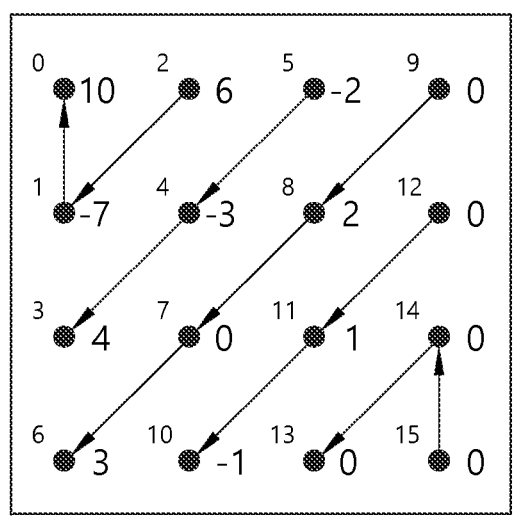
FIG. 5 is a diagram illustrating an example of transform coefficients in a 4×4 block.

FIG. 5 is a diagram illustrating an example of transform coefficients in a 4×4 block.

The 4×4 block of FIG. 5 shows an example of quantized coefficients. The block illustrated in FIG. 5 may be a 4×4 transform block, or a 4×4 sub-block of an 8×8, 16×16, 32×32, or 64×64 transform block. The 4×4 block of FIG. 5 may be a luminance block or a chrominance block. The encoding result for the inverse diagonally scanned coefficients of FIG. 5 may be, for example, shown in Table 3. In Table 3, scan_pos indicates the position of the coefficient according to the inverse diagonal scan. scan_pos 15 is a coefficient which is scanned first in the 4×4 block, that is, a coefficient at a bottom-right corner, and scan_pos 0 is a coefficient which is scanned last, that is, a coefficient at a top-left corner. Meanwhile, in one embodiment, the scan_pos may be referred to as a scan position. For example, the scan_pos 0 may be referred to as scan position 0.

TABLE 3

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | −1 | 0 | 2 | 0 | 3 | −2 | −3 | 4 | 6 | −7 | 10 |
| sig_coeff_flag | 0 | 0 | 0 | 0 | 1 | 1 | 0 | 1 | 0 | 1 | 1 | 1 | 1 | 1 | 1 | 1 |
| par_level_flag | | | | | 0 | 0 | | 1 | | 0 | 1 | 0 | 1 | 1 | 0 | 1 |
| rem_abs_gt1_flag | | | | | 0 | 0 | | 0 | | 1 | 0 | 1 | 1 | 1 | 1 | 1 |
| rem_abs_gt2_flag | | | | | | | | 0 | | | 0 | 0 | 1 | 1 | 1 |
| abs_remainder | | | | | | | | | | | | | | 0 | 1 | 2 |
| ceoff_sign_flag | | | | | 0 | 1 | | 0 | | 0 | 1 | 1 | 0 | 0 | 1 | 0 |

Meanwhile, as described with reference to Table 1, prior to encoding the residual signal and the special residual signal, whether or not to apply the transform of the corresponding block is first transmitted. By expressing the correlation between the residual signals in the transform domain, compaction of data is achieved and transmitted to the decoding apparatus. If the correlation between the residual signals is insufficient, data compaction may not occur sufficiently. In this case, a conversion process including a complex calculation process may be omitted, and a residual signal in the pixel domain (spatial domain) may be transferred to the decoding apparatus.

Since the residual signal of the pixel domain that has not been subjected to transform has different characteristics (the distribution of the residual signal, the absolute level of each residual signal, etc.) from the residual signal of the general transformation domain, a residual signal encoding method for efficiently transmitting such a signal to a decoding apparatus according to an example of the present disclosure will be proposed hereinafter.

Figure 6:
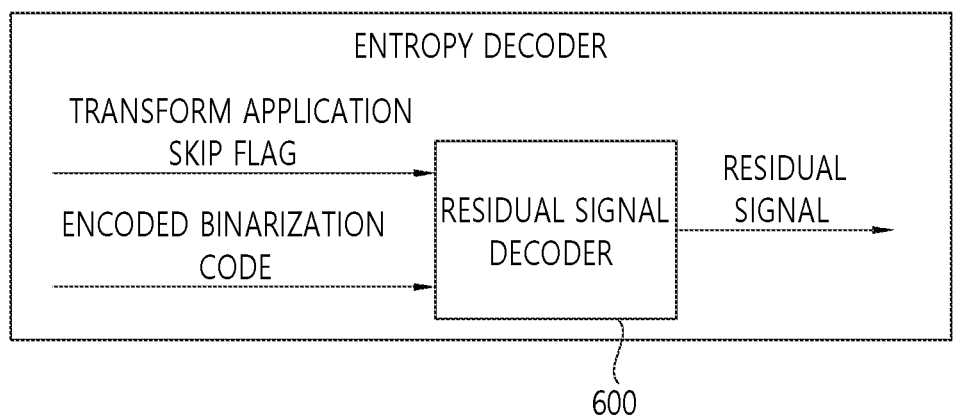
FIG. 6 is a diagram illustrating a residual signal decoder according to an example of the present disclosure.

FIG. 6 is a diagram illustrating a residual signal decoder according to an example of the present disclosure.

As illustrated, a transformation application flag indicating whether or not a transform is applied to a corresponding transform block and information on the encoded binarization code may be input to the residual signal decoder 600, and a decoded residual signal may be output from the residual signal decoder 600.

A flag for whether or not to apply a transform may be expressed as transform_skip_flag, and the encoded binarization code may be input to the residual signal decoder 600 through the binarization process.

The transform skip flag is transmitted in units of transform blocks, and in Table 1 the flag for whether or not to transform is limited to a specific block size (a condition of parsing the transform skip flag is included only when the transform block size is 4×4 or less). However, in the present embodiment, the size of a block for determining whether or not to parse the transform skip flag may be variously configured. The sizes of Log2TbWidth and log2TbHeight are determined as variables wN and hN, and the wN and the hN may be selected as one of the following.

$wN=\{2,3,4,5\}$ $wH=\{2,3,4,5\}$ [Equation 5]

A syntax element to which Equation 5 may be applied is as follows.

TABLE 4 if( transform_skip_enabled_flag &&
( cIdx != 0 || cu_mts_flag[ x0 ][ y0 ] == 0 ) &&
  ( log2TbWidth <= wN ) && ( log2TbHeight <= hN ) )
    transform_skip_flag[ x0 ][ y0 ][ cIdx ]     ae(v)

As described above, a method of decoding the residual signal may be determined according to the transform skip flag. Through the proposed method, it is possible to reduce the complexity in the entropy decoding process and improve the encoding efficiency by efficiently processing signals having different statistical characteristics from each other.

As described in Table 1 and the above embodiment, before encoding the residual signal (residual or transform coefficient), whether or not to apply the transform of the corresponding block is first transmitted to the decoding apparatus. By expressing the correlation between the residual signals in the transform domain, data is compressed and transmitted to the decoding apparatus. If the correlation between the residual signals is insufficient, data compression may not occur sufficiently. In this case, the transform process including a complex calculation process can be omitted and a residual signal in the pixel domain (spatial domain) can be transmitted to the decoding apparatus. The residual signal of the pixel domain that is skipped transform has different characteristics (the distribution of the residual signal, the absolute level of each residual signal, etc.) from that of the general transform domain.

Therefore, in this embodiment, a residual signal encoding method for efficiently transmitting such signals to the decoding apparatus is proposed. In more detail, we propose a method of parsing coded_block_flag according to transform_skip_flag.

In general, as shown in Table 1, the presence or absence of a residual signal of a lower block is first transmitted for efficient transmission of the residual coefficient, and this information is transmitted as a syntax element called coded_block_flag. If coded_block_flag is 1, it means that a residual signal exists in the corresponding sub-block, and the signal is reconstructed through a residual coefficient decoding process. If coded_block_flag is 0, it means that the residual coefficient does not exist in the corresponding sub-block, so the residual signal parsing for the sub-block is no longer performed, but the next sub-block is parsed.

Meanwhile, in the case of the residual coefficient of the pixel domain, unlike the residual of the transform domain, since the correlation between data is very low and has randomness, it is possible to transmit redundant information that is not necessary to transmit the coded_block_flag. Therefore, in this embodiment, a method of parsing coded_block_flag is proposed only when transform_skip_flag is 0.

An example of syntax elements for describing the proposed method is shown in Table 5 below. In Table 5, "&& transform_skip_flag[x0][y0][cIdx]" is specified as a condition for parsing coded_block_flag.

TABLE 5

| | Descriptor |
|---|---|
| residual_coding( x0, y0, log2TbWidth, log2TbHeight, cIdx ) { | |
|     if( transform_skip_enabled_flag && ( cIdx ! = 0 \|\| cu_mts_flag[ x0 ][ y0 ] = = 0 ) && | |
|       ( log2TbWidth <= wN ) && ( log2TbHeight <= hN ) ) | |
|       transform_skip_flag[ x0 ][ y0 ][ cIdx ] | ae(v) |
|     last_sig_coeff_x_prefix | ae(v) |
|     last_sig_coeff_y_prefix | ae(v) |
|     if( last_sig_coeff_x_prefix > 3 ) | |
|       last_sig_coeff_x_suffix | ae(v) |
|     if( last_sig_coeff_y_prefix > 3 ) | |
|       last_sig_coeff_y_suffix | ae(v) |
|     log2SbSize = ( Min( log2TbWidth, log2TbHeight ) < 2 ? 1 : 2 ) | |
|     numSbCoeff = 1 << ( log2SbSize << 1 ) | |
|     lastScanPos = numSbCoeff | |
|     lastSubBlock = ( 1 << ( log2TbWidth + log2TbHeight - 2 * log2SbSize ) ) - 1 | |
|     do { | |
|       if( lastScanPos = = 0 ) { | |
|         lastScanPos = numSbCoeff | |
|         lastSubBlock- - | |
|       } | |
|       lastScanPos- - | |
|       xS = DiagScanOrder[ log2TbWidth - log2SbSize ][ log2TbHeight - log2SbSize ] | |
|         [ lastSubBlock ][ 0 ] | |
|       yS = DiagScanOrder[ log2TbWidth - log2SbSize ][ log2TbHeight - log2SbSize ] | |
|         [ lastSubBlock ][ 1 ] | |
|       xC = ( xS << log2SbSize ) + | |
|         DiagScanOrder[ log2SbSize ][ log2SbSize ][ lastScanPos ][ 0 ] | |
|       yC = ( yS << log2SbSize ) + | |
|         DiagScanOrder[ log2SbSize ][ log2SbSize ][ lastScanPos ][ 1 ] | |
|     } while( ( xC != LastSignificantCoeffX ) \|\| ( yC != LastSignificantCoeffY ) ) | |
|     numSigCoeff = 0 | |
|     QState = 0 | |
|     for( i = lastSubBlock; i >= 0; i- - ) { | |
|       startQStateSb = QState | |
|       xS = DiagScanOrder[ log2TbWidth - log2SbSize ][ log2TbHeight - log2SbSize ] | |
|         [ lastSubBlock ][ 0 ] | |
|       yS = DiagScanOrder[ log2TbWidth - log2SbSize ][ log2TbHeight - log2SbSize ] | |
|         [ lastSubBlock ][ 1 ] | |
|       inferSbDcSigCoeffFlag = 0 | |
|       if( ( i < lastSubBlock ) && ( i > 0 ) && transform_skip_flag[ x0 ][ y0 ][ cIdx ] ) { | |
|         coded_sub_block_flag[ xS ][ yS ] | ae(v) |
|         inferSbDcSigCoeffFlag = 1 | |
|       } | |
|       firstSigScanPosSb = numSbCoeff | |
|       lastSigScanPosSb = -1 | |
|       remBinsPass1 = ( log2SbSize < 2 ? 6 : 28 ) | |
|       remBinsPass2 = ( log2SbSize < 2 ? 2 : 4 ) | |
|       firstPosMode0 = ( i = = lastSubBlock ? lastScanPos - 1 : numSbCoeff - 1 ) | |
|       firstPosMode1 = -1 | |
|       firstPosMode2 = -1 | |

TABLE 5-continued

| | Descriptor |
|---|---|
| ```
        for( n = firstPosMode0; n >= 0 && remBinsPass1 >= 3; n- - ) {
            xC = ( xS << log2SbSize ) + DiagScanOrder[ log2SbSize ][ log2SbSize ][ n ][ 0 ]
            yC = ( yS << log2SbSize ) + DiagScanOrder[ log2SbSize ][ log2SbSize ][ n ][ 1 ]
            if( coded_sub_block_flag[ xS ][ yS ] && ( n > 0 || !inferSbDcSigCoeffFlag ) )
{
                sig_coeff_flag[ xC ][ yC ]
                remBinsPass1- -
                if( sig_coeff_flag[ xC ][ yC ] )
                    inferSbDcSigCoeffFlag = 0
            }
            if( sig_coeff_flag[ xC ][ yC ] ) {
                numSigCoeff++
                abs_level_gt1_flag[ n ]
                remBinsPass1- -
                if( abs_level_gt1_flag[ n ] ) {
                    par_level_flag[ n ]
                    remBinsPass1- -
                    if( remBinsPass2 >0 ) {
                        remBinsPass2- -
                        if( remBinsPass2 = = 0 )
                            firstPosMode1 = n- 1
                    }
                }
                if( lastSigScanPosSb = = -1 )
                    lastSigScanPosSb = n
                firstSigScanPosSb = n
            }
            AbsLevelPass1[ xC ][ yC ] =
                    sig_coeff_flag[ xC ][ yC ] + par_level_flag[ n ] + abs_level_gt1_flag[ n ]
            if( dep_quant_enabled_flag )
                QState = QStateTransTable[ QState ][ AbsLevelPass1[ xC ][ yC ] & 1 ]
            if( remBinsPass1 < 3 )
                firstPosMode2 = n - 1
        }
        if( firstPosMode1 < firstPosMode2 )
            firstPosMode1 = firstPosMode2
        for( n = numSbCoeff - 1; n > firstPosMode1; n- - ) {
            if( abs_level_gt1_flag[ n ] )
                abs_level_gt2_flag[ n ]
        }
        for( n = numSbCoeff - 1; n > firstPosMode1; n- - ) {
            xC = ( xS << log2SbSize ) + DiagScanOrder[ log2SbSize ][ log2SbSize ][ n ][ 0 ]
            yC = ( yS << log2SbSize ) + DiagScanOrder[ log2SbSize ][ log2SbSize ][ n ][ 1 ]
            if( abs_level_gt3_flag[ n ] )
                abs_remainder[ n ]
            AbsLevel[ xC ][ yC ] = AbsLevelPass1[ xC ][ yC ] +
                                    2 * ( abs_level_gt3_flag[ n ] + abs_remainder[ n ] )
        }
        for( n = firstPosMode1; n > firstPosMode2; n- - ) {
            xC = ( xS << log2SbSize ) + DiagScanOrder[ log2SbSize ][ log2SbSize ][ n ][ 0 ]
            yC = ( yS << log2SbSize ) + DiagScanOrder[ log2SbSize ][ log2SbSize ][ n ][ 1 ]
            if( abs_level_gt1_flag[ n ] )
                abs_remainder[ n ]
            AbsLevel[ xC ][ yC ] = AbsLevelPass1[ xC ][ yC ] + 2 * abs_remainder[ n ]
        }
        for( n = firstPosMode2; n >= 0; n- - ) {
            xC = ( xS << log2SbSize ) + DiagScanOrder[ log2SbSize ][ log2SbSize ][ n ][ 0 ]
            yC = ( yS << log2SbSize ) + DiagScanOrder[ log2SbSize ][ log2SbSize ][ n ][ 1 ]
            abs_level[ n ]
            AbsLevel[ xC ][ yC ] = abs_level[ n ]
            if( abs_level[ n ] > 0 )
                firstSigScanPosSb = n
            if( dep_quant_enabled_flag )
                QState = QStateTransTable[ QState ][ abs_level[ n ] & 1 ]
        }
        if( dep_quant_enabled_flag || !sign_data_hiding_enabled_flag )
            signHidden = 0
        else
            signHidden = ( lastSigScanPosSb - firstSigScanPosSb > 3 ? 1 : 0 )
        for( n = numSbCoeff - 1; n >= 0; n- - ) {
            xC = ( xS << log2SbSize ) + DiagScanOrder[ log2SbSize ][ log2SbSize ][ n ][ 0 ]
            yC = ( yS << log2SbSize ) + DiagScanOrder[ log2SbSize ][ log2SbSize ][ n ][ 1 ]
            if( sig_coeff_flag[ xC ][ yC ] &&
                    ( !signHidden || ( n != firstSigScanPosSb ) ) )
                coeff_sign_flag[ n ]
        }
        if( dep_quant_enabled_flag ) {
            QState = startQStateSb
``` | ae(v)<br><br><br><br><br><br><br><br><br>ae(v)<br><br><br><br><br><br><br><br><br><br><br><br><br><br><br><br><br><br><br><br><br><br><br><br><br><br>ae(v)<br><br><br><br><br><br><br><br><br><br><br><br><br><br><br><br><br><br><br><br><br><br><br><br><br><br><br><br><br><br><br><br>ae(v) |

TABLE 5-continued

| | Descriptor |
|---|---|
| ```
        for( n = numSbCoeff - 1; n >= 0; n- - ) {
            xC = ( xS << log2SbSize ) +
                    DiagScanOrder[ log2SbSize ][ log2SbSize ][ n ][ 0 ]
            yC = ( yS << log2SbSize ) +
                    DiagScanOrder[ log2SbSize ][ log2SbSize ][ n ][ 1 ]
            if( sig_coeff_flag[ xC ][ yC ] )
                TransCoeffLevel[ x0 ][ y0 ][ cIdx ][ xC ][ yC ] =
                        ( 2 * AbsLevel[ xC ][ yC ] - ( QState > 1 ? 1 : 0 ) ) *
                        ( 1 - 2 * coeff_sign_flag[ n ] )
                QState = QStateTransTable[ QState ][ par_level_flag[ n ] ]
        } else {
            sumAbsLevel = 0
            for( n = numSbCoeff - 1; n >= 0; n- - ) {
                xC = ( xS << log2SbSize ) +
                        DiagScanOrder[ log2SbSize ][ log2SbSize ][ n ][ 0 ]
                yC = ( yS << log2SbSize ) +
                        DiagScanOrder[ log2SbSize ][ log2SbSize ][ n ][ 1 ]
                if( sig_coeff_flag[ xC ][ yC ] ) {
                    TransCoeffLevel[ x0 ][ y0 ][ cIdx ][ xC ][ yC ] =
                        AbsLevel[ xC ][ yC ] * ( 1 - 2 * coeff_sign_flag[ n ] )
                    if( signHidden ) {
                        sumAbsLevel += AbsLevel[ xC ][ yC ]
                        if( ( n = = firstSigScanPosSb ) && ( sumAbsLevel % 2 ) = = 1 ) )
                            TransCoeffLevel[ x0 ][ y0 ][ cIdx ][ xC ][ yC ] =
                                -TransCoeffLevel[ x0 ][ y0 ][ cIdx ][ xC ][ yC ]
                    }
                }
            }
        }
    }
    if( cu_mts_flag[ x0 ][ y0 ] && ( cIdx = = 0 ) &&
        !transform_skip_flag[ x0 ][ y0 ][ cIdx ] &&
        ( ( CuPredMode[ x0 ][ y0 ] = = MODE_INTRA && numSigCoeff > 2 ) ||
            ( CuPredMode[ x0 ][ y0 ] = = MODE_INTER ) ) ) {
        mts_idx[ x0 ][ y0 ]
}
``` | ae(v) |

Figure 7:
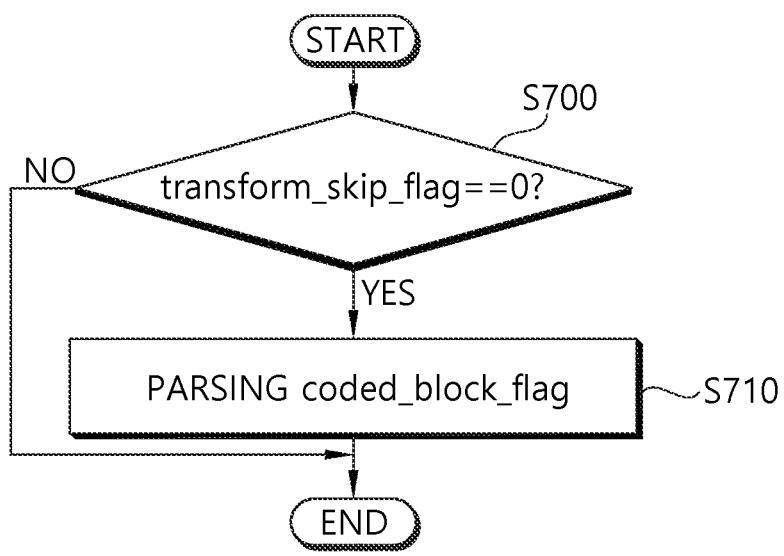
FIG. 7 is a control flowchart illustrating a method of parsing coded_block_flag according to an embodiment of the present disclosure.
Figure 8:
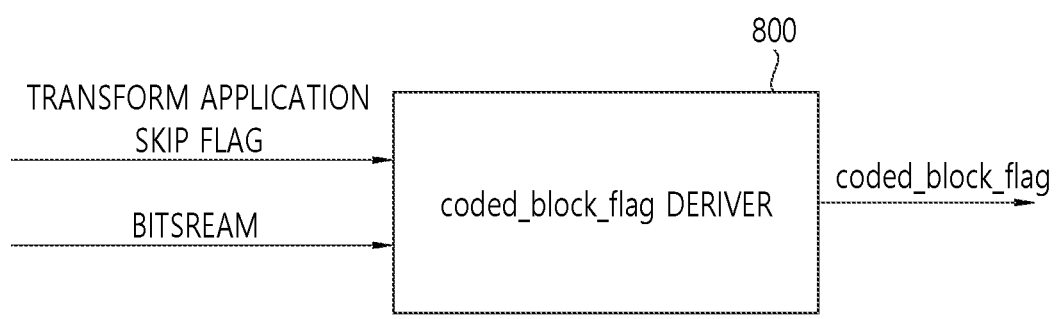
FIG. 8 shows a coded_block_flag deriver that performs parsing in FIG. 7.

FIG. 7 is a control flowchart illustrating a method of parsing coded_block_flag according to an embodiment of the present disclosure and FIG. 8 shows a coded_block_flag deriver that performs parsing in FIG. 7.

As shown, a transform application skip flag indicating whether or not a transform has been applied, such as transform_skip_flag, and a bitstream including the flag are input into a coded_block_flag deriver 800, and a coded_block_flag may be output based on these.

The coded_block_flag deriver 800 may determine whether the transform skip is applied to the transform block based on whether the transform_skip_flag is 0, the parsed transform_skip_flag value, or the transform_skip_flag parsing (S700).

If transform_skip_flag is 0, since the transform skip is not applied and the transform is applied to the transform block, the coded_block_flag deriver 800 parses the coded_block_flag as described above (S710).

On the other hand, if transform_skip_flag is 1 instead of 0, the transform block is not transformed because transform skip is applied, and thus coded_block_flag is not parsed as described above.

According to an embodiment, as described in Table 1 and the above embodiment, whether or not to apply a transform of a corresponding block before encoding a residual signal (residual or transform coefficient) is first transmitted to the decoding apparatus. By expressing the correlation between the residual signals in the transform domain, data is compressed and transmitted to the decoding apparatus. If the correlation between the residual signals is insufficient, data compression may not occur sufficiently. In this case, the transform process including a complex calculation process can be omitted and a residual signal in the pixel domain (spatial domain) can be transmitted to the decoding apparatus.

The residual signal of the pixel domain that is skipped transform has different characteristics (the distribution of the residual signal, the absolute level of each residual signal, etc.) from that of the general transform domain. Therefore, in this embodiment, a residual signal encoding method for efficiently transmitting such signals to the decoding apparatus is proposed. In more detail, we propose a method of parsing coded_block_flag according to transform_skip_flag.

In general, as shown in Table 1, the presence or absence of a residual signal of a lower block is first transmitted for efficient transmission of the residual coefficient, and this information is transmitted as a syntax element called coded_block_flag. If coded_block_flag is 1, it means that a residual signal exists in the corresponding sub-block, and the signal is reconstructed through a residual coefficient decoding process. If coded_block_flag is 0, it means that the residual coefficient does not exist in the corresponding sub-block, so the residual signal parsing for the sub-block is no longer performed, but the next sub-block is parsed.

Meanwhile, in the case of the residual coefficient of the pixel domain, unlike the residual of the transform domain, since the correlation between data is very low and has randomness, it is possible to transmit redundant information that is not necessary to transmit the coded_block_flag. In particular, in the case of an intra prediction block, as the distance from the left and top of the block increases, the size of the residual increases. If not transformed, these characteristics are reflected as it is, so in a large block, information as like the transformed residual is not implied in the upper left corner of the block, and the residual still exists in the lower right corner. Thus transmitting coded_block_flag to all lower blocks is that redundant information can be transmitted.

Therefore, in this embodiment, a method of parsing coded_block_flag is proposed only when the size of a target block (transform block or subblock) for residual coding is greater than a certain size and transform_skip_flag is 0. In one example, the predetermined maximum width and maximum height of the target block, that is, the width threshold and the height threshold of the transform block may be represented by log2ThWSize and log2ThHSize, respectively, and these values are one of among 2, 3, 4, 5, 6, 7 and 8 respectively. However, in this document, the value for the size of the transform block is not limited to the specific value described above.

An example of syntax elements for describing the proposed method is shown in Table 6 below. In Table 6, "(log2TbWidth<=wN) && (log2TbHeight<=hN)" is specified, and the parsing condition of coded sub_block_flag[xS][yS] is "&& transform_skip_flag[x0][y0][cIdx] && log2TbWidth<log2ThWSize && log2TbHeight<log2ThSizeH" is specified.

TABLE 6

| | Descriptor |
|---|---|
| residual_coding( x0, y0, log2TbWidth, log2TbHeight, cIdx ) { | |
|     if( transform_skip_enabled_flag && ( cIdx ! = 0 \|\| cu_mts_flag[ x0 ][ y0 ] = = 0 ) && | |
|       ( log2TbWidth <= wN ) && ( log2TbHeight <= hN ) ) | |
|         transform_skip_flag[ x0 ][ y0 ][ cIdx ] | ae(v) |
|     last_sig_coeff_x_prefix | ae(v) |
|     last_sig_coeff_y_prefix | ae(v) |
|     if( last_sig_coeff_x_prefix > 3 ) | |
|         last_sig_coeff_x_suffix | ae(v) |
|     if( last_sig_coeff_y_prefix > 3 ) | |
|         last_sig_coeff_y_suffix | ae(v) |
|     log2SbSize = ( Min( log2TbWidth, log2TbHeight ) < 2 ? 1 : 2 ) | |
|     numSbCoeff = 1 << ( log2SbSize << 1 ) | |
|     lastScanPos = numSbCoeff | |
|     lastSubBlock = ( 1 << ( log2TbWidth + log2TbHeight − 2 * log2SbSize ) ) − 1 | |
|     do { | |
|       if( lastScanPos = = 0 ) { | |
|         lastScanPos = numSbCoeff | |
|         lastSubBlock− − | |
|       } | |
|       lastScanPos− − | |
|       xS = DiagScanOrder[ log2TbWidth − log2SbSize ][ log2TbHeight − log2SbSize ] | |
|             [ lastSubBlock ][ 0 ] | |
|       yS = DiagScanOrder[ log2TbWidth − log2SbSize ][ log2TbHeight − log2SbSize ] | |
|             [ lastSubBlock ][ 1 ] | |
|       xC = ( xS << log2SbSize ) + | |
|         DiagScanOrder[ log2SbSize ][ log2SbSize ][ lastScanPos ][ 0 ] | |
|       yC = ( yS << log2SbSize ) + | |
|         DiagScanOrder[ log2SbSize ][ log2SbSize ][ lastScanPos ][ 1 ] | |
|     } while( ( xC != LastSignificantCoeffX ) \|\| ( yC != LastSignificantCoeffY ) ) | |
|     numSigCoeff = 0 | |
|     QState = 0 | |
|     for( i = lastSubBlock; i >= 0; i− − ) { | |
|       startQStateSb = QState | |
|       xS = DiagScanOrder[ log2TbWidth − log2SbSize ][ log2TbHeight − log2SbSize ] | |
|             [ lastSubBlock ][ 0 ] | |
|       yS = DiagScanOrder[ log2TbWidth − log2SbSize ][ log2TbHeight − log2SbSize ] | |
|             [ lastSubBlock ][ 1 ] | |
|       inferSbDcSigCoeffFlag = 0 | |
|         if( ( i < lastSubBlock ) && ( i > 0 ) && transform_skip_flag[ x0 ][ y0 ][ cIdx ] && | |
|       log2TbWidth < log2TbWSize && log2TbHeight < log2TbSizeH ) { | |
|             coded_sub_block_flag[ xS ][ yS ] | ae(v) |
|             inferSbDcSigCoeffFlag = 1 | |
|       } | |
|       firstSigScanPosSb = numSbCoeff | |
|       lastSigScanPosSb = −1 | |
|       remBinsPass1 = ( log2SbSize < 2 ? 6 : 28 ) | |
|       remBinsPass2 = ( log2SbSize < 2 ? 2 : 4 ) | |
|       firstPosMode0 = ( i = = lastSubBlock ? lastScanPos − 1 : numSbCoeff − 1 ) | |
|       firstPosMode1 = −1 | |
|       firstPosMode2 = −1 | |
|       for( n = firstPosMode0; n >= 0 && remBinsPass1 >= 3; n− − ) { | |
|         xC = ( xS << log2SbSize ) + DiagScanOrder[ log2SbSize ][ log2SbSize ][ n ][ 0 ] | |
|         yC = ( yS << log2SbSize ) + DiagScanOrder[ log2SbSize ][ log2SbSize ][ n ][ 1 ] | |
|         if( coded_sub_block_flag[ xS ][ yS ] && ( n > 0 \|\| !inferSbDcSigCoeffFlag ) ) | |
|       { | |
|             sig_coeff_flag[ xC ][ yC ] | ae(v) |
|             remBinsPass1− − | |
|             if( sig_coeff_flag[ xC ][ yC ] ) | |
|                 inferSbDcSigCoeffFlag = 0 | |
|       } | |
|         if( sig_coeff_flag[ xC ][ yC ] ) { | |
|             numSigCoeff++ | |

TABLE 6-continued

| | Descriptor |
|---|---|
| ```
            abs_level_gt1_flag[ n ]
            remBinsPass1- -
            if( abs_level_gt1_flag[ n ] ) {
                par_level_flag[ n ]
                remBinsPass1- -
                if( remBinsPass2 > 0 ) {
                    remBinsPass2- -
                    if( remBinsPass2 = = 0 )
                        firstPosMode1 = n - 1
                }
            }
            if( lastSigScanPosSb = = -1 )
                lastSigScanPosSb = n
            firstSigScanPosSb = n
        }
        AbsLevelPass1[ xC ][ yC ] =
            sig_coeff_flag[ xC ][ yC ] + par_level_flag[ n ] + abs_level_gt1_flag[ n ]
        if( dep_quant_enabled_flag )
            QState = QStateTransTable[ QState ][ AbsLevelPass1[ xC ][ yC ] & 1 ]
        if( remBinsPass1 < 3 )
            firstPosMode2 = n - 1
    }
    if( firstPosMode1 < firstPosMode2 )
        firstPosMode1 = firstPosMode2
    for( n = numSbCoeff - 1; n > firstPosMode1; n- - ) {
        if( abs_level_gt1_flag[ n ] )
            abs_level_gt2_flag[ n ]
``` | ae(v)<br><br><br><br><br><br><br><br><br><br><br><br><br><br><br><br><br><br><br><br><br><br><br><br>ae(v) |
| ```
    }
    for( n = numSbCoeff - 1; n > firstPosMode1; n- - ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        if( abs_level_gt3_flag[ n ] )
            abs_remainder[ n ]
        AbsLevel[ xC ][ yC ] = AbsLevelPass1[ xC ][ yC ] +
                            2 * ( abs_level_gt3_flag[ n ] + abs_remainder[ n ] )
    }
    for( n = firstPosMode1; n > firstPosMode2; n- - ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        if( abs_level_gt1_flag[ n ] )
            abs_remainder[ n ]
        AbsLevel[ xC ][ yC ] = AbsLevelPass1[ xC ][ yC ] + 2 * abs_remainder[ n ]
    }
    for( n = firstPosMode2; n >= 0; n- - ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        abs_level[ n ]
        AbsLevel[ xC ][ yC ] = abs_level[ n ]
        if( abs_level[ n ] > 0 )
            firstSigScanPosSb = n
        if( dep_quant_enabled_flag )
            QState = QStateTransTable[ QState ][ abs_level[ n ] & 1 ]
    }
    if( dep_quant_enabled_flag || !sign_data_hiding_enabled_flag )
        signHidden = 0
    else
        signHidden = ( lastSigScanPosSb - firstSigScanPosSb > 3 ? 1 : 0 )
    for( n = numSbCoeff - 1; n >= 0; n- - ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        if( sig_coeff_flag[ xC ][ yC ] &&
            ( !signHidden || ( n != firstSigScanPosSb ) ) )
            coeff_sign_flag[ n ]
    }
    if( dep_quant_enabled_flag ) {
        QState = startQStateSb
        for( n = numSbCoeff - 1; n >= 0; n- - ) {
            xC = ( xS << log2SbSize ) +
                    DiagScanOrder[ log2SbSize ][ log2SbSize ][ n ][ 0 ]
            yC = ( yS << log2SbSize ) +
                    DiagScanOrder[ log2SbSize ][ log2SbSize ][ n ][ 1 ]
            if( sig_coeff_flag[ xC ][ yC ] )
                TransCoeffLevel[ x0 ][ y0 ][ cIdx ][ xC ][ yC ] =
                        ( 2 * AbsLevel[ xC ][ yC ] - ( QState > 1 ? 1 : 0 ) ) *
                        ( 1 - 2 * coeff_sign_flag[ n ] )
            QState = QStateTransTable[ QState ][ par_level_flag[ n ] ]
    } else {
        sumAbsLevel = 0
``` | <br><br><br><br><br><br><br><br><br><br><br><br><br><br><br><br><br><br><br><br><br><br><br><br><br><br>ae(v) |

TABLE 6-continued

Descriptor

```
            for( n = numSbCoeff − 1; n >= 0; n− − ) {
                xC = ( xS << log2SbSize ) +
                        DiagScanOrder[ log2SbSize ][ log2SbSize ][ n ][ 0 ]
                yC = ( yS << log2SbSize ) +
                        DiagScanOrder[ log2SbSize ][ log2SbSize ][ n ][ 1 ]
                if( sig_coeff_flag[ xC ][ yC ] ) {
                    TransCoeffLevel[ x0 ][ y0 ][ cIdx ][ xC ][ yC ] =
                            AbsLevel[ xC ][ yC ] * ( 1 − 2 * coeff_sign_flag[ n ] )
                    if( signHidden ) {
                        sumAbsLevel += AbsLevel[ xC ][ yC ]
                        if( ( n = = firstSigScanPosSb ) && ( sumAbsLevel % 2 ) = = 1 ) )
                            TransCoeffLevel[ x0 ][ y0 ][ cIdx ][ xC ][ yC ] =
                                    −TransCoeffLevel[ x0 ][ y0 ][ cIdx ][ xC ][ yC ]
                    }
                }
            }
        }
    }
    if( cu_mts_flag[ x0 ][ y0 ] && ( cIdx = = 0 ) &&
        !transform_skip_flag[ x0 ][ y0 ][ cIdx ] &&
        ( ( CuPredMode[ x0 ][ y0 ] = = MODE_INTRA && numSigCoeff > 2 ) ||
          ( CuPredMode[ x0 ][ y0 ] = = MODE_INTER ) ) ) {
        mts_idx[ x0 ][ y0 ]                                                         ae(v)
    }
}
```

Figure 9:
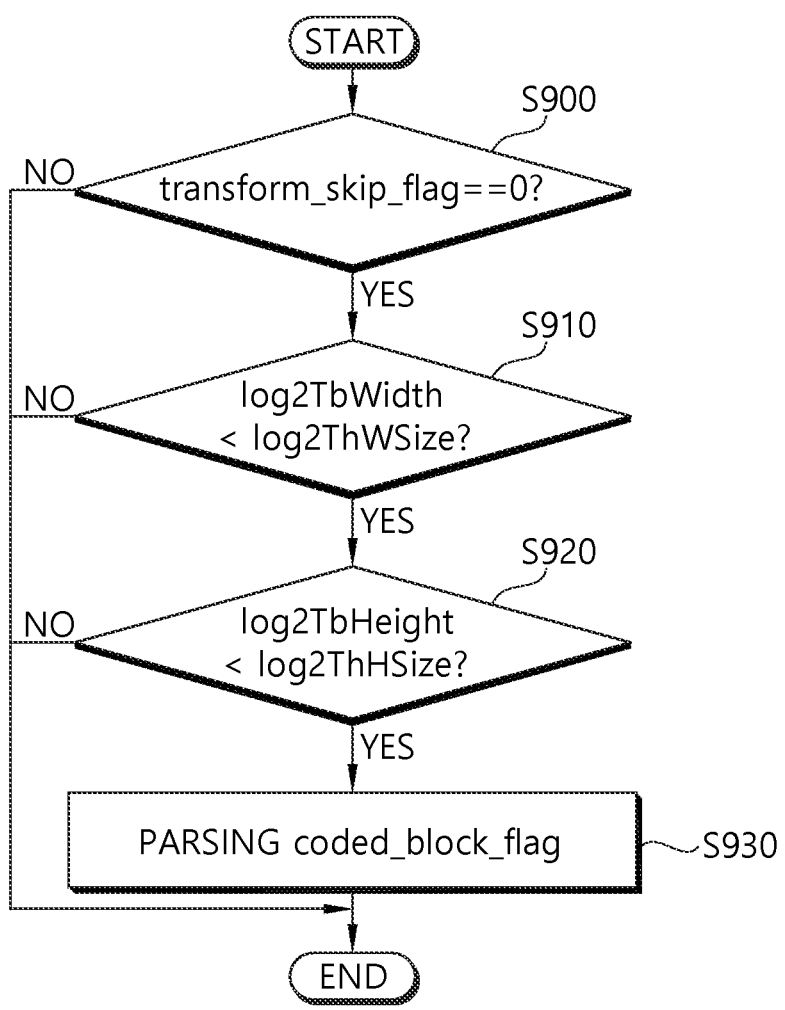
FIG. 9 is a control flowchart illustrating a method of parsing coded_block_flag according to another embodiment of the present disclosure.
Figure 10:
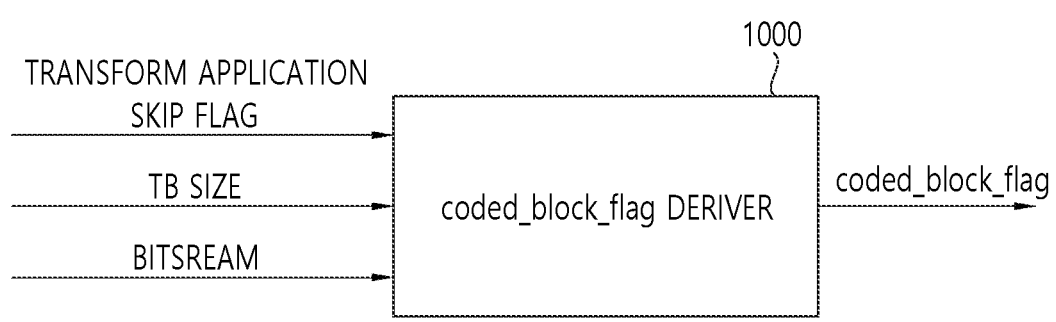
FIG. 10 shows a coded_block_flag deriver that performs parsing in FIG. 9.

FIG. 9 is a control flowchart illustrating a method of parsing coded_block_flag according to another embodiment of the present disclosure and FIG. 10 shows a coded_block_flag deriver that performs parsing in FIG. 9.

As shown, a transform application skip flag indicating whether or not a transform has been applied, such as transform_skip_flag, a size of the transform block and a bitstream including the same are input into a coded_block_flag deriver 1000, and a coded_block_flag may be output based on these.

The coded_block_flag deriver 1000 may determine whether the transform skip is applied to the transform block based on whether the transform_skip_flag is 0, the parsed transform_skip_flag value, or the transform_skip_flag parsing (S900).

If transform_skip_flag is 0, since the transform skip is not applied and the transform is applied to the transform block, the coded_block_flag deriver 1000 may determine whether the width of the transform block (log2TbWidth) is less than a predetermined threshold value (log2ThWSize) (S910).

If the width of the transform block (log2TbWidth) is less than the predetermined threshold value (log2ThWSize), it may be determined whether the height of the transform block (log2TbHeight) is less than a predetermined threshold value (log2ThHSize) (S920).

As described above, coded_block_flag is parsed as described above only when the width of the transform block (log2TbWidth) is less than the predetermined threshold value (log2ThWSize), and the height of the transform block (log2TbHeight) is also less than the predetermined threshold value (log2ThHSize) (S930).

On the other hand, if transform_skip_flag is 1 instead of 0, the transform block is not transformed because the transform skip is applied, the transform block width (log2TbWidth) is greater than the predetermined threshold value (log2ThWSize), or the transform block height (log2TbHeight) is greater than the predetermined threshold value (log2ThHSize), the coded_block_flag deriver 1000 does not parse the coded_block_flag as described above.

According to an embodiment, as described in Table 1 and the above embodiment, whether or not to apply a transform of a corresponding block before encoding a residual signal (residual or transform coefficient) is first transmitted to the decoding apparatus. By expressing the correlation between the residual signals in the transform domain, data is compressed and transmitted to the decoding apparatus. If the correlation between the residual signals is insufficient, data compression may not occur sufficiently. In this case, the transform process including a complex calculation process can be omitted and a residual signal in the pixel domain (spatial domain) can be transmitted to the decoding apparatus.

The residual signal of the pixel domain that is skipped transform has different characteristics (the distribution of the residual signal, the absolute level of each residual signal, etc.) from that of the general transform domain. Therefore, in this embodiment, a residual signal encoding method for efficiently transmitting such signals to the decoding apparatus is proposed. In more detail, we propose a method of parsing context elements indicating the position of the last coefficient such as last_sig_coeff_x_prefix, last_sig_coeff_y_prefix, last_sig_coeff_x_suffix, last_sig_coeff_y_suffix according to transform_skip_flag.

In general, as shown in Table 1, the presence or absence of a residual signal of a lower block is first transmitted for efficient transmission of the residual coefficient, in order to parse this information, information on the position where the non-zero residual coefficient first occurs is transmitted to the decoding apparatus with the bottom-right of the transform block as a starting point. Such position information is encoded in context elements of last_sig_coeff_x_prefix, last_sig_coeff_y_prefix, last_sig_coeff_x_suffix, and last_sig_coeff_y_suffix and transmitted to the decoding apparatus. The residual coefficient is decoded from the last coefficient position derived by these context elements according to the scanning order, and The residual coefficients from the lower right position of the transform block to the last coefficient position can be inferred as 0.

Meanwhile, in the case of the residual coefficient of the pixel domain, unlike the residual of the transform domain, since the correlation between data is very low and has randomness, it is possible to transmit redundant information that is not necessary to transmit the coded_block_flag. In particular, in the case of an intra prediction block, as the distance from the left and top of the block increases, the size of the residual increases. If not transformed, these characteristics are reflected as it is, so in a large block, information as like the transformed residual is not implied in the upper left corner of the block, and the residual still exists in the lower right corner. Thus transmitting the last transform coefficient position information to all lower blocks is that redundant information can be transmitted.

Therefore, in this embodiment, a method of parsing context elements indicating the position of the last coefficient such as last_sig_coeff_x_prefix, last_sig_coeff_y_prefix, last_sig_coeff_x_suffix, last_sig_coeff_y_suffix is proposed only when transform_skip_flag is 0 for the transform block.

Figure 11:
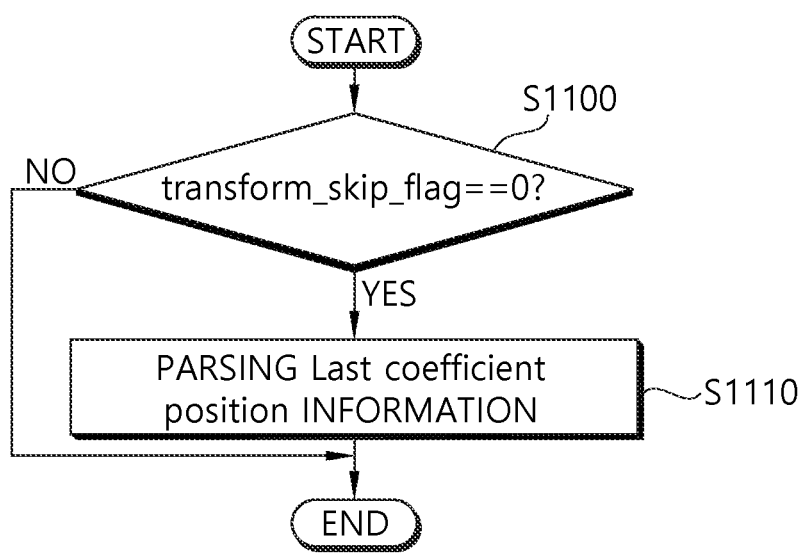
FIG. 11 is a control flowchart illustrating a method of deriving last significant coefficient positon according to an embodiment of the present disclosure.
Figure 12:
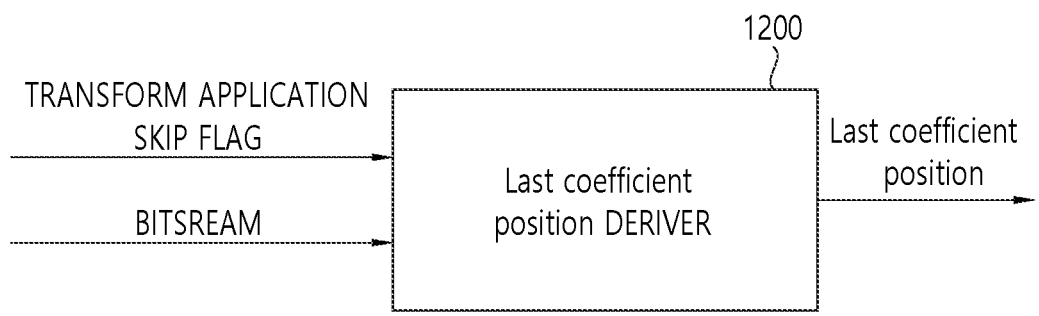
FIG. 12 shows a last coefficient positon deriver that performs deriving in FIG. 11.

FIG. 11 is a control flowchart illustrating a method of deriving last significant coefficient positon according to an embodiment of the present disclosure and FIG. 12 shows a last coefficient positon deriver that performs deriving in FIG. 11.

As shown, a transform application skip flag indicating whether or not a transform has been applied, such as transform_skip_flag, and a bitstream including the flag are input into a Last coefficient position deriver 1200, and last coefficient positon information may be output based on these.

The Last coefficient position deriver 1200 may determine whether the transform skip is applied to the transform block based on whether the transform_skip_flag is 0, the parsed transform_skip_flag value, or the transform_skip_flag parsing (S1100).

If transform_skip_flag is 0, since the transform skip is not applied and the transform is applied to the transform block, the Last coefficient position deriver 1200 parses the last coefficient positon information as described above (S1110).

On the other hand, if transform_skip_flag is 1 instead of 0, the transform block is not transformed because transform skip is applied, and thus the last coefficient positon information is not parsed as described above.

According to an embodiment, as described in Table 1 and the above embodiment, whether or not to apply a transform of a corresponding block before encoding a residual signal (residual or transform coefficient) is first transmitted to the decoding apparatus. By expressing the correlation between the residual signals in the transform domain, data is compressed and transmitted to the decoding apparatus. If the correlation between the residual signals is insufficient, data compression may not occur sufficiently. In this case, the transform process including a complex calculation process can be omitted and a residual signal in the pixel domain (spatial domain) can be transmitted to the decoding apparatus.

The residual signal of the pixel domain that is skipped transform has different characteristics (the distribution of the residual signal, the absolute level of each residual signal, etc.) from that of the general transform domain. Therefore, in this embodiment, a residual signal encoding method for efficiently transmitting such signals to the decoding apparatus is proposed. We propose a method of parsing context elements indicating the position of the last coefficient such as last_sig_coeff_x_prefix, last_sig_coeff_y_prefix, last_sig_coeff_x_suffix, last_sig_coeff_y_suffix according to transform_skip_flag and a size of the transform block.

In general, as shown in Table 1, the presence or absence of a residual signal of a lower block is first transmitted for efficient transmission of the residual coefficient, in order to parse this information, information on the position where the non-zero residual coefficient first occurs is transmitted to the decoding apparatus with the bottom-right of the transform block as a starting point. Such position information is encoded in context elements of last_sig_coeff_x_prefix, last_sig_coeff_y_prefix, last_sig_coeff_x_suffix, and last_sig_coeff_y_suffix and transmitted to the decoding apparatus. The residual coefficient is decoded from the last coefficient position derived by these context elements according to the scanning order, and The residual coefficients from the lower right position of the transform block to the last coefficient position can be inferred as 0.

Meanwhile, in the case of the residual coefficient of the pixel domain, unlike the residual of the transform domain, since the correlation between data is very low and has randomness, it is possible to transmit redundant information that is not necessary to transmit the coded_block_flag. In particular, in the case of an intra prediction block, as the distance from the left and top of the block increases, the size of the residual increases. If not transformed, these characteristics are reflected as it is, so in a large block, information as like the transformed residual is not implied in the upper left corner of the block, and the residual still exists in the lower right corner. Thus transmitting the last transform coefficient position information to all lower blocks is that redundant information can be transmitted.

Therefore, in this embodiment, a method of parsing context elements indicating the position of the last coefficient such as last_sig_coeff_x_prefix, last_sig_coeff_y_prefix, last_sig_coeff_x_suffix, last_sig_coeff_y_suffix is proposed only when he size of the target block (transform block or sub-block) for residual coding is equal to or more than a certain size and transform_skip_flag is 0. In one example, a predetermined maximum width and maximum height of the target block, that is, the width threshold and the height threshold of the transform block may be represented by log2ThWSize and log2ThHSize, respectively, and these values are one of among 2, 3, 4, 5, 6, 7 and 8 respectively. However, in this document, the value for the size of the transform block is not limited to the specific value described above.

Figure 13:
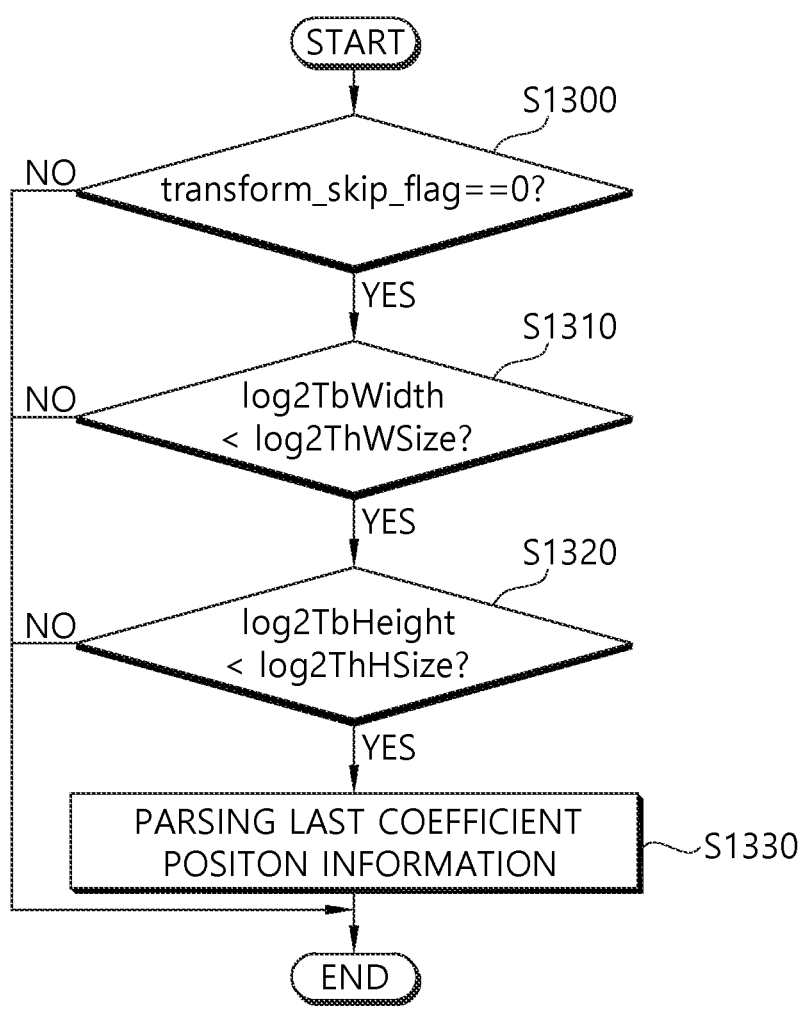
FIG. 13 is a control flowchart illustrating a method of deriving last significant coefficient positon according to another embodiment of the present disclosure.
Figure 14:
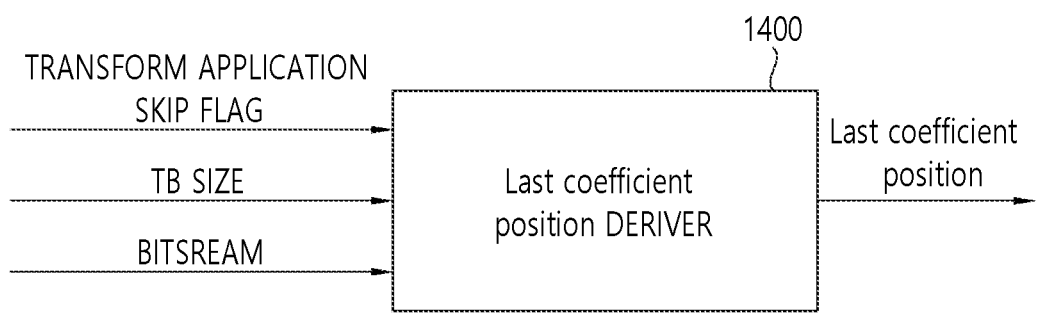
FIG. 14 shows a last coefficient positon deriver that performs deriving in FIG. 13.

FIG. 13 is a control flowchart illustrating a method of deriving last significant coefficient positon according to another embodiment of the present disclosure and FIG. 14 shows a last coefficient positon deriver that performs deriving in FIG. 13.

As shown, a transform application skip flag indicating whether or not a transform has been applied, such as transform_skip_flag, a size of the transform block and a bitstream including the same are input into a Last coefficient position deriver 1400, and last coefficient positon information may be output based on these.

The Last coefficient position deriver 1400 may determine whether the transform skip is applied to the transform block based on whether the transform_skip_flag is 0, the parsed transform_skip_flag value, or the transform_skip_flag parsing (S1300).

If transform_skip_flag is 0, since the transform skip is not applied and the transform is applied to the transform block, the Last coefficient position deriver 1400 may determine whether the width of the transform block (log2TbWidth) is less than the predetermined threshold value (log2ThWSize) (S1310).

If the width of the transform block (log2TbWidth) is less than the predetermined threshold value (log2ThWSize), it may be determined whether the height of the transform block (log2TbHeight) is less than a predetermined threshold value (log2ThHSize) (S1320).

As described above, the last coefficient positon information is parsed as described above only when the width of the transform block (log2TbWidth) is less than the predetermined threshold value (log2ThWSize), and the height of the transform block (log2TbHeight) is also less than the predetermined threshold value (log2ThHSize) (S1330).

On the other hand, if transform_skip_flag is 1 instead of 0, the transform block is not transformed because the transform skip is applied, the transform block width (log2TbWidth) is greater than the predetermined threshold value (log2ThWSize), or the transform block height (log2TbHeight) is greater than the predetermined threshold value (log2ThHSize), the Last coefficient position deriver 1400 does not parse the last coefficient positon information as described above.

Meanwhile, syntax elements rem_abs_gt1_flag and rem_abs_gt2_flag may be represented based on abs_level_gtx_flag[n][j] as described above, and may also be expressed as abs_rem_gt1_flag and abs_rem_gt2_flag, or abs_rem_gtx_flag.

As described above, according to embodiments of the present disclosure, different residual coding schemes, that is, residual syntax, may be applied depending on whether or not transform skip is applied for residual coding.

For example, information on the position of the last significant coefficient (last_sig_coeff_x_prefix, last_sig_coeff_y_prefix, last_sig_coeff_x_suffix, last_sig_coeff_y_suffix) is encoded only when a transform skip is applied to a transform block, transmitted to a decoding apparatus, and parsed.

For example, the signaling order of the flag (coeff_sign_flag) for the sign of the transform coefficient may be different depending on whether or not the transform skip is applied. When transformation skip is not applied, coeff_sign_flag is signaled after abs_remainder, while when transform skip is applied, coeff_sign_flag may be signaled before rem_abs_gt1_flag.

In addition, for example, rem_abs_gt1_flag, rem_abs_gt2_flag, that is, rem_abs_gtx_flag parsing and a parsing loop for abs_remainder may vary depending on whether transform skip is applied.

Additionally, the context syntax element encoded through arithmetic coding based on context may include a significant coefficient flag (sig_coeff_flag) indicating whether or not the quantized transform coefficient is a non-zero significant coefficient, a parity level flag (par_level_flag) for parity of a transform coefficient level for the quantized transform coefficient, a first transform coefficient level flag (rem_abs_gt1_flag) for whether or not the transform coefficient level is greater than a first threshold, and a second transform coefficient level flag (rem_abs_gt2_flag) for whether the transform coefficient level of the quantized transform coefficient is greater than a second threshold. In this case, the decoding of the first transform coefficient level flag may be performed prior to the decoding of the parity level flag.

Tables 7 to 9 show the context elements according to above-described example.

TABLE 7

```
transform_skip_flag[ x0 ][ y0 ]                                                    ae(v)
if( ( ( CuPredMode[ chType ][ x0 ][ y0 ] = = MODE_INTER &&
    sps_explicit_mts_inter_enabled_flag )
    || ( CuPredMode[ chType ][ x0 ][ y0 ] = = MODE_INTRA &&
    sps_explicit_mts_intra_enabled_flag ) ) && ( !transform_skip_flag[ x0 ][ y0 ] ) )
    tu_mts_idx[ x0 ][ y0 ]                                                         ae(v)
}
if( tu_cbf_luma[ x0 ][ y0 ] ) {
    if( !transform_skip_flag[ x0 ][ y0 ] )
        residual_coding( x0, y0, Log2( tbWidth ), Log2( tbHeight ), 0 )
    else
        residual_ts_coding( x0, y0, Log2( tbWidth ), Log2( tbHeight ), 0 )
}
if( tu_cbf_cb[ x0 ][ y0 ] )
    residual_coding( xC, yC, Log2( wC ), Log2( hC ), 1 )
if( tu_cbf_cr[ x0 ][ y0 ] &&
    !( tu_cbf_cb[ x0 ][ y0 ] && tu_joint_cbcr_residual_flag[ x0 ][ y0 ] )) {
    residual_coding( xC, yC, Log2( wC ), Log2( hC ), 2 )
}
}
```

TABLE 8

|  | Descriptor |
|---|---|
| residual_coding( x0, y0, log2TbWidth, log2TbHeight, cIdx ) { <br>    if( ( tu_mts_idx[ x0 ][ y0 ] > 0 \|\| <br>        ( cu_sbt_flag && log2TbWidth < 6 && log2TbHeight < 6 ) ) <br>        && cIdx = = 0 && log2TbWidth > 4 ) <br>        log2ZoTbWidth = 4 <br>    else <br>        log2ZoTbWidth = Min( log2TbWidth, 5 ) <br>    MaxCcbs = 2 * ( 1 << log2TbWidth ) * ( 1<< log2TbHeight ) <br>    if( tu_mts_idx[ x0 ][ y0 ] > 0 \|\| <br>        ( cu_sbt_flag && log2TbWidth < 6 && log2TbHeight < 6 ) ) <br>        && cIdx = = 0 && log2TbHeight > 4 ) <br>        log2ZoTbHeight = 4 <br>    else <br>        log2ZoTbHeight = Min( log2TbHeight, 5 ) <br>    if( log2TbWidth > 0 ) <br>        last_sig_coeff_x_prefix |  |
|     if( log2TbHeight > 0 ) <br>        last_sig_coeff_y_prefix | ae(v) |
|     if( last_sig_coeff_x_prefix > 3 ) <br>        last_sig_coeff_x_suffix | ae(v) |
|     if( last_sig_coeff_y_prefix > 3 ) <br>        last_sig_coeff_y_suffix | ae(v) |
|     log2TbWidth = log2ZoTbWidth <br>    log2TbHeight = log2ZoTbHeight <br>    remBinsPass1 = ( ( 1 << ( log2TbWidth + log2TbHeight ) ) * 7 ) >> 2 <br>    log2SbW = ( Min( log2TbWidth, log2TbHeight ) < 2 ? 1 : 2 ) <br>    log2SbH = log2SbW <br>    if( log2TbWidth + log2TbHeight > 3 ) { <br>        if( log2TbWidth < 2 ) { <br>            log2SbW = log2TbWidth <br>            log2SbH = 4 − log2SbW <br>        } else if( log2TbHeight < 2 ) { <br>            log2SbH = log2TbHeight <br>            log2SbW = 4 − log2SbH <br>        } <br>    } <br>    numSbCoeff = 1 << ( log2SbW + log2SbH ) <br>    lastScanPos = numSbCoeff <br>    lastSubBlock = ( 1 << ( log2TbWidth + log2TbHeight − ( log2SbW + log2SbH ) ) ) − 1 <br>    do { <br>        if( lastScanPos = = 0 ) { <br>            lastScanPos = numSbCoeff <br>            lastSubBlock− − <br>        } <br>        lastScanPos− − <br>        xS = DiagScanOrder[ log2TbWidth − log2SbW ][ log2TbHeight − log2SbH ] <br>                [ lastSubBlock ][ 0 ] <br>        yS = DiagScanOrder[ log2TbWidth − log2SbW ][ log2TbHeight − log2SbH ] <br>                [ lastSubBlock ][ 1 ] <br>        xC = ( xS << log2SbW ) + DiagScanOrder[ log2SbW ][ log2SbH ][ lastScanPos ][ 0 ] <br>        yC = ( yS << log2SbH ) + DiagScanOrder[ log2SbW ][ log2SbH ][ lastScanPos ][ 1 ] <br>    } while( ( xC != LastSignificantCoeffX ) \|\| ( yC != LastSignificantCoeffY ) ) <br>    if( lastSubBlock = = 0 && log2TbWidth >= 2 && log2TbHeight >= 2 <br>&& <br>        !transform_skip_flag[ x0 ][ y0 ] && lastScanPos > 0 ) <br>        LfnstDcOnly = 0 <br>    if( ( lastSubBlock > 0 && log2TbWidth >= 2 && log2TbHeight >= 2 ) \|\| <br>        ( lastScanPos > 7 && ( log2TbWidth = = 2 \|\| log2TbWidth = = 3 ) && <br>        log2TbWidth = = log2TbHeight ) ) <br>        LfnstZeroOutSigCoeffFlag = 0 <br>    QState = 0 <br>    for( i = lastSubBlock; i >= 0; i− − ) { <br>        startQStateSb = QState <br>        xS = DiagScanOrder[ log2TbWidth − log2SbW ][ log2TbHeight − log2SbH ] <br>                [ i ][ 0 ] <br>        yS = DiagScanOrder[ log2TbWidth − log2SbW ][ log2TbHeight − log2SbH ] <br>                [ i ][ 1 ] <br>        inferSbDcSigCoeffFlag = 0 <br>        if( ( i < lastSubBlock ) && ( i > 0 ) ) { <br>            coded_sub_block_flag[ xS ][ yS ] | ae(v) |
|             inferSbDcSigCoeffFlag = 1 <br>        } <br>        firstSigScanPosSb = numSbCoeff <br>        lastSigScanPosSb = −1 <br>        firstPosMode0 = ( i = = lastSubBlock ? lastScanPos : numSbCoeff − 1 ) <br>        firstPosMode1 = −1 <br>        for( n = firstPosMode0; n >= 0 && remBinsPass1 >= 4; n− − ) { <br>            xC = ( xS << log2SbW ) + DiagScanOrder[ log2SbW ][ log2SbH ][ n ][ 0 ] |  |

TABLE 8-continued

| | Descriptor |
|---|---|
| ```
            yC = ( yS << log2SbH ) + DiagScanOrder[ log2SbW ][ log2SbH ][ n ][ 1 ]
            if( coded_sub_block_flag[ xS ][ yS ] && ( n > 0 || !inferSbDcSigCoeffFlag ) &&
                ( xC != LastSignificantCoeffX || yC != LastSignificantCoeffY ) ) {
                sig_coeff_flag[ xC ][ yC ]
                remBinsPass1- -
                if( sig_coeff_flag[ xC ][ yC ] )
                    inferSbDcSigCoeffFlag = 0
            }
            if( sig_coeff_flag[ xC ][ yC ] ) {
                abs_level_gtx_flag[ n ][ 0 ]
                remBinsPass1- -
                if( abs_level_gtx_flag[ n ][ 0 ] ) {
                    par_level_flag[ n ]
                    remBinsPass1- -
                    abs_level_gtx_flag[ n ][ 1 ]
                    remBinsPass1- -
                }
                if( lastSigScanPosSb = = −1 )
                    lastSigScanPosSb = n
                firstSigScanPosSb = n
            }
            AbsLevelPass1[ xC ][ yC ] = sig_coeff_flag[ xC ][ yC ] + par_level_flag[ n ] +
                                        abs_level_gtx_flag[ n ][ 0 ] + 2 * abs_level_gtx_flag[ n ][ 1 ]
            if( dep_quant_enabled_flag )
                QState = QStateTransTable[ QState ][ AbsLevelPass1[ xC ][ yC ] & 1 ]
            if( remBinsPass1 < 4 )
                firstPosMode1 = n − 1
        }
        for( n = numSbCoeff − 1; n >= firstPosMode1; n- - ) {
            xC = ( xS << log2SbW ) + DiagScanOrder[ log2SbW ][ log2SbH ][ n ][ 0 ]
            yC = ( yS << log2SbH ) + DiagScanOrder[ log2SbW ][ log2SbH ][ n ][ 1 ]
            if( abs_level_gtx_flag[ n ][ 1 ] )
                abs_remainder[ n ]
            AbsLevel[ xC ][ yC ] = AbsLevelPass1[ xC ][ yC ] +2 * abs_remainder[ n ]
        }
        for( n = firstPosMode1; n >= 0; n- - ) {
            xC = ( xS << log2SbW ) + DiagScanOrder[ log2SbW ][ log2SbH ][ n ][ 0 ]
            yC = ( yS << log2SbH ) + DiagScanOrder[ log2SbW ][ log2SbH ][ n ][ 1 ]
            dec_abs_level[ n ]
            if(AbsLevel[ xC ][ yC ] > 0 )
                firstSigScanPosSb = n
            if( dep_quant_enabled_flag )
                QState = QStateTransTable[ QState ][ AbsLevel[ xC ][ yC ] & 1 ]
        }
        if( dep_quant_enabled_flag || !sign_data_hiding_enabled_flag )
            signHidden = 0
        else
            signHidden = ( lastSigScanPosSb − firstSigScanPosSb > 3 ? 1 : 0 )
        for( n = numSbCoeff − 1; n >= 0; n- - ) {
            xC = ( xS << log2SbW ) + DiagScanOrder[ log2SbW ][ log2SbH ][ n ][ 0 ]
            yC = ( yS << log2SbH ) + DiagScanOrder[ log2SbW ][ log2SbH ][ n ][ 1 ]
            if( (AbsLevel[ xC ][ yC ] > 0 ) &&
                ( !signHidden || ( n != firstSigScanPosSb ) ) )
                coeff_sign_flag[ n ]
        }
        if( dep_quant_enabled_flag ) {
            QState = startQStateSb
            for( n = numSbCoeff − 1; n >= 0; n- - ) {
                xC = ( xS << log2SbW ) + DiagScanOrder[ log2SbW ][ log2SbH ][ n ][ 0 ]
                yC = ( yS << log2SbH ) + DiagScanOrder[ log2SbW ][ log2SbH ][ n ][ 1 ]
                if( AbsLevel[ xC ][ yC ] > 0 )
                    TransCoeffLevel[ x0 ][ y0 ][ cIdx ][ xC ][ yC ] =
                        ( 2 * AbsLevel[ xC ][ yC ] − ( QState > 1 ? 1 : 0 ) ) *
                        ( 1 − 2 * coeff_sign_flag[ n ] )
                QState = QStateTransTable[ QState ][ par_level_flag[ n ] ]
            }
        } else {
            sumAbsLevel = 0
            for( n = numSbCoeff − 1; n >= 0; n- - ) {
                xC = ( xS << log2SbW ) + DiagScanOrder[ log2SbW ][ log2SbH ][ n ][ 0 ]
                yC = ( yS << log2SbH ) + DiagScanOrder[ log2SbW ][ log2SbH ][ n ][ 1 ]
``` | ae(v)<br><br><br><br><br>ae(v)<br><br><br>ae(v)<br><br>ae(v)<br><br><br><br><br><br><br><br><br><br><br><br><br><br><br>ae(v)<br><br><br><br><br><br>ae(v)<br><br><br><br><br><br><br><br><br><br><br><br><br>ae(v) |

TABLE 8-continued

| | Descriptor |
|---|---|
| ```
            if( AbsLevel[ xC ][ yC ] > 0 ) {
                TransCoeffLevel[ x0 ][ y0 ][ cIdx ][ xC ][ yC ] =
                    AbsLevel[ xC ][ yC ] * ( 1 − 2 * coeff_sign_flag[ n ] )
                if( signHidden ) {
                    sumAbsLevel += AbsLevel[ xC ][ yC ]
                    if( ( n = = firstSigScanPosSb ) && ( sumAbsLevel % 2 ) = = 1 ) )
                        TransCoeffLevel[ x0 ][ y0 ][ cIdx ][ xC ][ yC ] =
                            −TransCoeffLevel[ x0 ][ y0 ][ cIdx ][ xC ][ yC ]
                }
            }
        }
    }
  }
 }
}
``` | |

TABLE 9

| | Descriptor |
|---|---|
| ```
residual_ts_coding( x0, y0, log2TbWidth, log2TbHeight, cIdx ) {
    log2SbSize = ( Min( log2TbWidth, log2TbHeight ) < 2 ? 1 : 2 )
    numSbCoeff = 1 << ( log2SbSize << 1 )
    lastSubBlock = ( 1 << ( log2TbWidth + log2TbHeight − 2 * log2SbSize ) ) − 1
    inferSbCbf = 1
    MaxCcbs = 2 * ( 1 << log2TbWidth ) * ( 1<< log2TbHeight )
    for( i =0; i <= lastSubBlock; i++ ) {
        xS = DiagScanOrder[ log2TbWidth − log2SbSize ][ log2TbHeight − log2SbSize ][ i ][ 0 ]
        yS = DiagScanOrder[ log2TbWidth − log2SbSize ][ log2TbHeight − log2SbSize ][ i ][ 1 ]
        if( ( i != lastSubBlock || !inferSbCbf ) {
            coded_sub_block_flag[ xS ][ yS ]
        }
        if( coded_sub_block_flag[ xS ][ yS ] && i < lastSubBlock )
            inferSbCbf = 0
        /* First scan pass */
        inferSbSigCoeffFlag = 1
        for( n = 0; n <= numSbCoeff − 1; n++ ) {
            xC = ( xS << log2SbSize ) + DiagScanOrder[ log2SbSize ][ log2SbSize ][ n ][ 0 ]
            yC = ( yS << log2SbSize ) + DiagScanOrder[ log2SbSize ][ log2SbSize ][ n ][ 1 ]
            if( coded_sub_block_flag[ xS ][ yS ] &&
                ( n != numSbCoeff − 1 || !inferSbSigCoeffFlag ) ) {
                sig_coeff_flag[ xC ][ yC ]
``` | ae(v) |
| ```
                MaxCcbs− −
                if( sig_coeff_flag[ xC ][ yC ] )
                    inferSbSigCoeffFlag = 0
            }
            CoeffSignLevel[ xC ][ yC ] = 0
            if( sig_coeff_flag[ xC ][ yC ] {
                coeff_sign_flag[ n ]
``` | ae(v) |
| ```
                MaxCcbs− −
                CoeffSignLevel[ xC ][ yC ] = ( coeff_sign_flag[ n ] > 0 ? −1 : 1 )
                abs_level_gtx_flag[ n ][ 0 ]
``` | ae(v) |
| ```
                MaxCcbs− −
                if( abs_level_gtx_flag[ n ][ 0 ] ) {
                    par_level_flag[ n ]
``` | ae(v) |
| ```
                    MaxCcbs− −
                }
            }
            AbsLevelPassX[ xC ][ yC ] =
                sig_coeff_flag[ xC ][ yC ] + par_level_flag[ n ] + abs_level_gtx_flag[ n ][ 0 ]
        }
        /* Greater than X scan pass (numGtXFlags=5) */
        for( n = 0; n <= numSbCoeff − 1; n++ ) {
            xC = ( xS << log2SbSize ) + DiagScanOrder[ log2SbSize ][ log2SbSize ][ n ][ 0 ]
            yC = ( yS << log2SbSize ) + DiagScanOrder[ log2SbSize ][ log2SbSize ][ n ][ 1 ]
            for( j = 1; j < 5; j++ ) {
                if( abs_level_gtx_flag[ n ][ j − 1 ] )
                    abs_level_gtx_flag[ n ][ j ]
``` | ae(v) |
| ```
                MaxCcbs− −
                AbsLevelPassX[ xC ][ yC ] + = 2 * abs_level_gtx_flag[ n ][ j ]
            }
        }
``` | |

TABLE 9-continued

Descriptor

```
        /* remainder scan pass */
            for( n = 0; n <= numSbCoeff - 1; n++ ) {
                xC = ( xS << log2SbSize ) + DiagScanOrder[ log2SbSize ][ log2SbSize ][ n ][ 0 ]
                yC = ( yS << log2SbSize ) + DiagScanOrder[ log2SbSize ][ log2SbSize ][ n ][ 1 ]
                if( abs_level_gtx_flag[ n ][ 4 ] )
                    abs_remainder[ n ]                                                           ae(v)
                if( intra_bdpcm_flag = = 0 ) {
                    absRightCoeff = abs( TransCoeffLevel[ x0 ][ y0 ][ cIdx ][ xC - 1 ][ yC ] )
                    absBelowCoeff = abs( TransCoeffLevel[ x0 ][ y0 ][ cIdx ][ xC ][ yC - 1 ] )
                    predCoeff = Max( absRightCoeff, absBelowCoeff )
                    if( AbsLevelPassX[ xC ][ yC ] + abs_remainder[ n ] = = 1 && predCoeff >
0 )
                        TransCoeffLevel[ x0 ][ y0 ][ cIdx ][ xC ][ yC ] =
                                ( 1 - 2 * coeff_sign_flag[ n ] ) * predCoeff
                    else if( AbsLevelPassX[ xC ][ yC ] + abs_remainder[ n ] <= predCoeff )
                        TransCoeffLevel[ x0 ][ y0 ][ cIdx ][ xC ][ yC ] = ( 1 - 2 * coeff_sign_flag[ n ] ) *
                                ( AbsLevelPassX[ xC ][ yC ] + abs_remainder[ n ] - 1)
                    else
                        TransCoeffLevel[ x0 ][ y0 ][ cIdx ][ xC ][ yC ] = ( 1 - 2 * coeff_sign_flag[ n ] ) *
                                ( AbsLevelPassX[ xC ][ yC ] + abs_remainder[ n ] )
                } else
                    TransCoeffLevel[ x0 ][ y0 ][ cIdx ][ xC ][ yC ] = ( 1 - 2 * coeff_sign_flag[ n ] ) *
                            ( AbsLevelPassX[ xC ][ yC ] + abs_remainder[ n ] )
            }
        }
}
```

Table 7 shows that residual coding is branched according to the value of transform_skip_flag, that is, different syntax elements are used for the residual. In addition, Table 8 shows residual coding in the case of transform_skip_flag having a value of 0, that is, in the case of the transform being applied, and Table 9 shows residual coding in the case of transform_skip_flag having a value of 1, that is, in the case of the transform not being applied.

In Tables 8 and 9, par_level_flag may be expressed as Equation 6 below.

$$\text{par\_level\_flag} = \text{coeff} \& 1 \qquad \text{[Equation 6]}$$

In addition, in Tables 8 and 9, since par_level_flag is parsed, that is, decoded after abs_level_gtx_flag, rem_abs_gt1_flag may indicate whether or not the transform coefficient at the corresponding scanning position n is greater than 1, and rem_abs_gt2_flag may indicate whether or not the transform coefficient at the corresponding scanning position n is greater than 3. That is, rem_abs_gt2_flag in Table 1 may be expressed as rem_abs_gt3_flag in Tables 8 and 9.

When Equations 2 to 3 are changed as described above, Equation 4 may be changed as follows in the case of following Tables 8 and 9.

$$|\text{coeff}| = \text{sig\_coeff\_flag} + \text{par\_level\_flag} + \text{rem\_abs\_gt1\_flag} + 2*(\text{rem\_abs\_gt2\_flag} + \text{abs\_remainder} \qquad \text{[Equation 7]}$$

Figure 15:
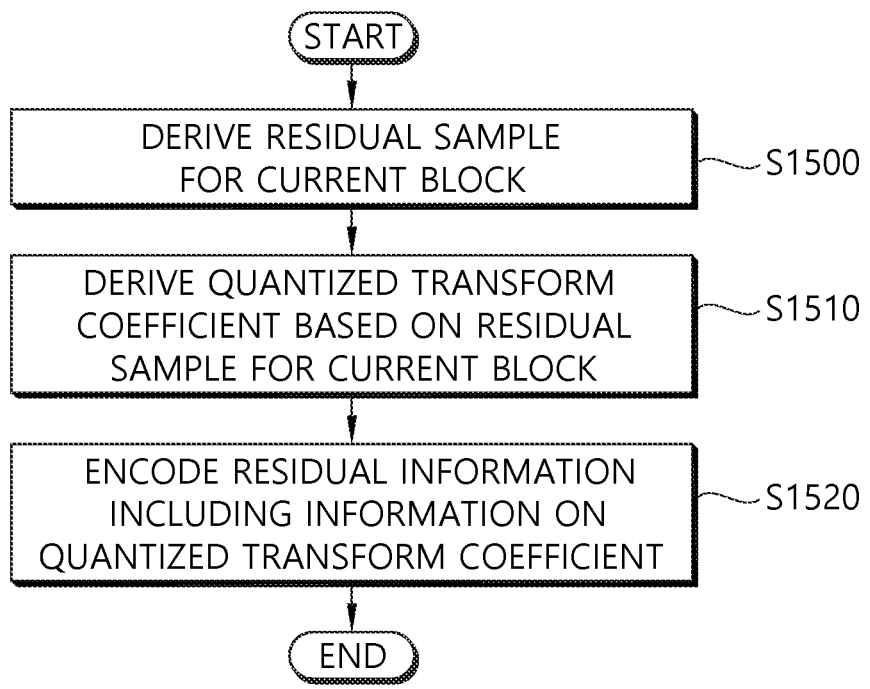
FIG. 15 is a control flowchart illustrating an operation of the encoding apparatus according to an embodiment of the present disclosure.
Figure 16:
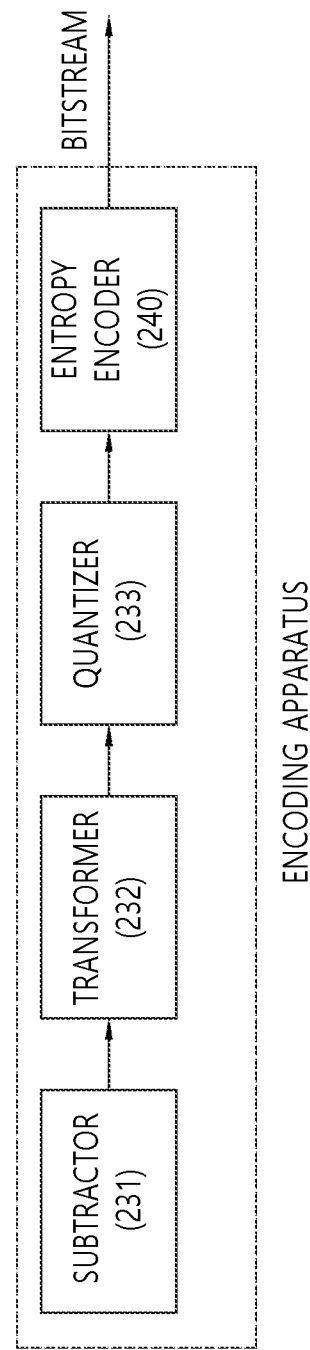
FIG. 16 is a diagram illustrating a configuration of the encoding apparatus according to an embodiment of the present disclosure.

FIG. 15 is a control flowchart illustrating an operation of the encoding apparatus according to an embodiment of the present disclosure and FIG. 16 is a diagram illustrating a configuration of the encoding apparatus according to an embodiment of the present disclosure.

Figure 17:
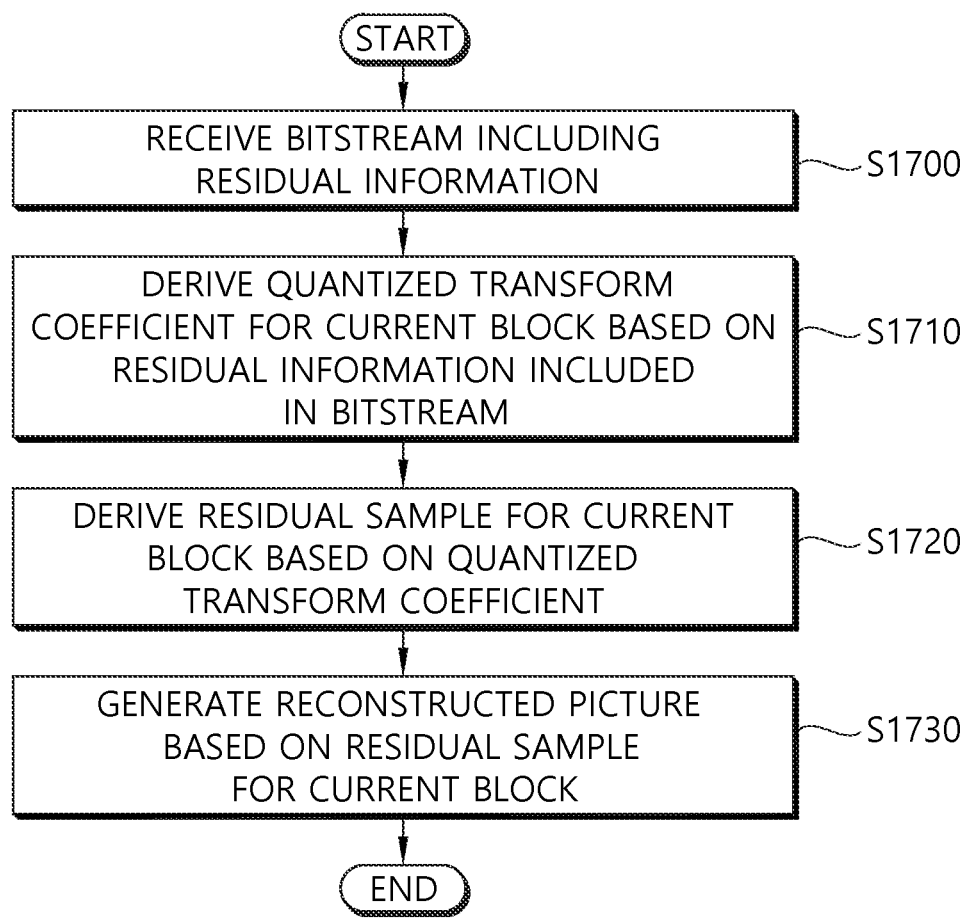
FIG. 17 is a control flowchart illustrating an operation of the decoding apparatus according to an embodiment of the present disclosure.
Figure 18:
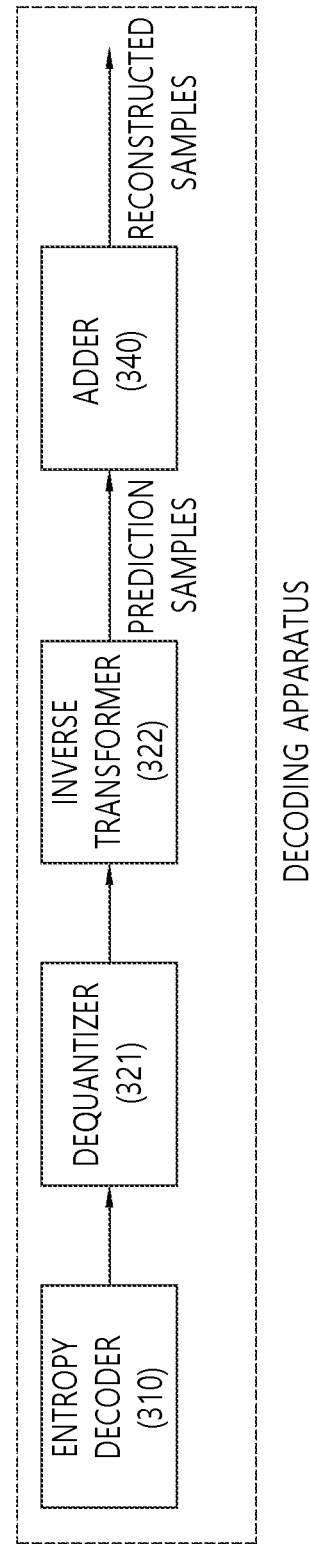
FIG. 18 is a diagram illustrating a configuration of the decoding apparatus according to an embodiment of the present disclosure.

The encoding apparatus according to FIGS. 15 and 16 may perform operations corresponding to the decoding apparatus according to FIGS. 17 and 18. Accordingly, operations of the decoding apparatus to be described later in FIGS. 17 and 18 may be similarly applied to the encoding apparatus according to FIGS. 15 and 16.

Each step disclosed in FIG. 15 may be performed by the encoding apparatus 200 disclosed in FIG. 2. More specifically, S1500 may be performed by the subtractor 231 disclosed in FIG. 2, S1510 may be performed by the quantizer 233 disclosed in FIG. 2, and S1520 may be performed by the entropy encoder 240. In addition, operations according to S1500 to S1520 are based on some of the contents described above in FIGS. 4 to 14. Accordingly, detailed descriptions overlapping with those described above in FIGS. 2 and 4 to 14 will be omitted or simplified.

As shown in FIG. 15, the encoding apparatus according to an embodiment may include the subtractor 231, the transformer 232, the quantizer 233, and the entropy encoder 240. However, in some cases, not all of the components shown in FIG. 15 may be essential components of the encoding apparatus, and the encoding device may be implemented by more or less components than the components shown in FIG. 15.

In the encoding apparatus according to an embodiment, the subtractor 231, the transformer 232, the quantize 233, and the entropy encoder 240 are each implemented as a separate chip, or at least two components can also be implemented through a single chip.

The encoding apparatus according to an embodiment may derive a residual sample for a current block (S1500). More specifically, the subtractor 231 of the encoding apparatus may derive a residual sample for the current block.

The encoding apparatus according to an embodiment may derive a quantized transform coefficient based on the residual sample for the current block (S1510). More specifically, the quantizer 233 of the encoding apparatus may derive the quantized transform coefficient based on the residual sample for the current block.

The encoding apparatus according to an embodiment may encode residual information including information on the quantized transform coefficient (S1520). More specifically, the entropy encoder 240 of the encoding apparatus may encode residual information including information on the quantized transform coefficient.

In an embodiment, the residual information may include information indicating the position of the last significant coefficient such as last_sig_coeff_x_prefix, last_sig_coeff_y_prefix, last_sig_coeff_x_suffix, and last_sig_coeff_y_suffix. More specifically, last_sig_coeff_x_prefix represents the prefix of the column position of the last significant coefficient in the scanning order in the transform block, and last_sig_coeff_y_prefix represents the prefix of the row position of the last significant coefficient in the scanning order in the transform block, and last_sig_coeff_x_suffix represents the suffix of the column position of the last significant coefficient in the scanning order in the transform block, and last_sig_coeff_y_suffix represents the suffix of the row position of the last significant coefficient in the scanning order in the transform block. Here, the significant coefficient may represent the non-zero coefficient. The scan order may be an upward-right diagonal scan order. Alternatively, the scan order may be a horizontal scan order or a vertical scan order. According to an example, information indicating the position of the last significant coefficient may be coded and decoded only when a transform skip is not applied to a transform block.

According to an example, information indicating the position of the last significant coefficient may be coded and decoded based on the size of the transform block when the transform skip is not applied to the transform block. For example, information indicating the position of the last significant coefficient may be coded and decoded only when the width and height of the transform block are less than a predetermined threshold.

According to another example, the residual information may include coded_sub_block_flag indicating whether a subblock includes a last non-zero coefficient, and this coded_sub_block_flag is coded and decoded only when a transform skip is not applied to a transform block.

According to an example, coded_sub_block_flag may be coded and decoded based on the size of the transform block when the transform skip is not applied to the transform block. For example, coded_sub_block_flag may be coded and decoded only when the width and height of the transform block are less than a predetermined threshold.

In one embodiment, the residual information includes a parity level flag for parity of a transform coefficient level for the quantized transform coefficient and a first transform coefficient level flag for whether the transform coefficient level is greater than a first threshold. In one example, the parity level flag indicates par_level_flag, the first transform coefficient level flag indicates rem_abs_gt1_flag or abs_level_gtx_flag[n][0], and the second transform coefficient level flag indicates rem_abs_gt1_flag or abs_level_gtx_flag[n][1].

In an embodiment, the encoding of the residual information may include deriving a value of the parity level flag and a value of the first transform coefficient level flag based on the quantized transform coefficient, and encoding the first transform coefficient level and encoding the parity level flag.

In an embodiment, the encoding the first transform coefficient level flag may be performed prior to the encoding the parity level flag. For example, the encoding apparatus may perform encoding for rem_abs_gt1_flag or abs_level_gtx_flag[n][0] before encoding for par_level_flag.

In an embodiment, the residual information may include a significant coefficient flag indicating whether the quantized transform coefficient is a non-zero effective coefficient, and a second transform coefficient level flag indicating whether the transform coefficient level for the quantized transform coefficient is greater than a second threshold. In one example, the significant coefficient flag may be sig_coeff_flag.

The residual information may include a context syntax element coded based on a context, and the context syntax element may include the significant coefficient flag, the parity level flag, the first transform coefficient level flag, and the second transform coefficient level flag.

In an embodiment, the deriving the quantized transform coefficient may encode the context syntax element based on a context and based on a predetermined maximum value for the context syntax element.

In other words, a sum of the number of significant coefficient flags for quantized transform coefficients in the current block, the number of first transform coefficient level flags, the number of parity level flags, and the number of second transform coefficient level flags included in the residual information may be less than or equal to a predetermined maximum value.

This maximum value is the sum of the number of significant coefficient flags for quantized transform coefficients related to the current sub-block in the current block, the number of first transform coefficient level flags, the number of parity level flags, and the number of second transform coefficient level flags.

In an embodiment, the maximum value may be determined in units of transform blocks. The current block may be a sub-block within the transform block which is a transform unit, and encoding of the quantized transform coefficient is performed in sub-block units, and when encoding the quantized transform coefficient in sub-block units, the context syntax element among residual information may be encoded based on the maximum value determined in units of transform blocks.

In an embodiment, this threshold value may be determined based on the size of the current block (or a current sub-block within the current block). If the current block is a transform block, the threshold value may be determined based on the size of the transform block.

In an embodiment, when the sum of the number of the significant coefficient flags, the number of the first transform coefficient level flags, the number of the parity level flags, and the number of the second transform coefficient level flags derived based on a 0th quantized transform coefficient to an nth quantized transform coefficient determined by a coefficient scan order reaches the predetermined maximum value, then explicit signaling of a significant coefficient flag, a first transform coefficient level flag, a parity level flag, and a second transform coefficient level flag may be omitted for a (n+1)th quantized transform coefficient determined by the coefficient scan order, and a value of the (n+1)th quantized transform coefficient may be derived based on a value of coefficient level information included in the residual information.

For example, when the sum of the number of sig_coeff_flag, the number of rem_abs_gt1_flag (or abs_level_gtx_flag[n][0]), the number of par_level_flags, and the number of rem_abs_gt2_flag (or abs_level_gtx_flag[n][1]) derived based on the 0th quantized transform coefficient (or the first quantized transform coefficient) to the nth quantized transform coefficient (or the nth quantized transform coefficient) determined by the coefficient scan order reaches the predetermined maximum value, then explicit signaling of sig_coeff_flag, rem_abs_gt1_flag (or abs_level_gtx_flag[n][0]), par_level_flag, abs_level_gtx_flag[n][1] and rem_abs_gt2_flag (or abs_level_gtx_flag[n][1]) may be omitted for a (n+1)th quantized transform coefficient determined by the coefficient scan order, and a value of the (n+1)th quantized transform coefficient may be derived based on the value of abs_remainder or dec_abs_level included in the residual information.

In an embodiment, the significant coefficient flags, the first transform coefficient level flags, the parity level flags, and the second transform coefficient level flags included in the residual information may be context-based coded, and the coefficient level information may be bypass-based coded.

FIG. 17 is a control flowchart illustrating an operation of the decoding apparatus according to an embodiment of the present disclosure and FIG. 18 is a diagram illustrating a configuration of the decoding apparatus according to an embodiment of the present disclosure.

Each step disclosed in FIG. 17 may be performed by the decoding apparatus 300 disclosed in FIG. 3. More specifically, S1700 and S1710 may be performed by the entropy decoder 310 disclosed in FIG. 3, and S1720 may be performed by the inverse quantization unit 321 and/or the inverse transformer 322 disclosed in FIG. 3. In addition, S1730 may be performed by the adder 340 disclosed in FIG. 3. In addition, operations according to S1700 to S1730 are based on some of the contents described above in FIGS. 4 to 14. Accordingly, detailed descriptions overlapping with those described above in FIGS. 3 to 14 will be omitted or simplified.

As shown in FIG. 18, the decoding apparatus according to an embodiment may include the entropy decoder 310, the inverse quantizer 321, the inverse transformer 322, and the adder 340. However, in some cases, not all of the components shown in FIG. 18 may be essential components of the decoding apparatus, and the decoding apparatus may be implemented by more or less components than those shown in FIG. 18.

In the decoding apparatus according to an embodiment, the entropy decoder 310, the inverse quantizer 321, the inverse transformer 322, and the adder 340 are each implemented as a separate chip, or at least two components can also be implemented through a single chip.

The decoding apparatus according to an embodiment may receive a bitstream including residual information (S1700). More specifically, the entropy decoder 310 of the decoding apparatus may receive a bitstream including residual information.

The decoding apparatus according to an embodiment may derive a quantized transform coefficient for a current block based on residual information included in a bitstream (S1710). More specifically, the entropy decoder 310 of the decoding apparatus may derive a quantized transform coefficient for the current block based on residual information included in the bitstream.

The decoding apparatus according to an embodiment may derive a residual sample for a current block based on the quantized transform coefficient (S1720). More specifically, the inverse quantizer 321 of the decoding apparatus may derive a transform coefficient from the quantized transform coefficient based on the inverse quantization process, and the inverse transformer 322 of the decoding apparatus may derive a residual sample for the current block by inversely transforming the transform coefficient.

The decoding apparatus according to an embodiment may generate a reconstructed picture based on the residual sample for a current block (S1730). More specifically, the adder 340 of the decoding apparatus may generate a reconstructed picture based on the residual sample for the current block.

In an embodiment, the residual information may include information indicating the position of the last significant coefficient such as last_sig_coeff_x_prefix, last_sig_coeff_y_prefix, last_sig_coeff_x_suffix, and last_sig_coeff_y_suffix. More specifically, last_sig_coeff_x_prefix represents the prefix of the column position of the last significant coefficient in the scanning order in the transform block, and last_sig_coeff_y_prefix represents the prefix of the row position of the last significant coefficient in the scanning order in the transform block, and last_sig_coeff_x_suffix represents the suffix of the column position of the last significant coefficient in the scanning order in the transform block, and last_sig_coeff_y_suffix represents the suffix of the row position of the last significant coefficient in the scanning order in the transform block. Here, the significant coefficient may represent the non-zero coefficient. The scan order may be an upward-right diagonal scan order. Alternatively, the scan order may be a horizontal scan order or a vertical scan order. According to an example, information indicating the position of the last significant coefficient may be coded and decoded only when a transform skip is not applied to a transform block.

According to an example, information indicating the position of the last significant coefficient may be coded and decoded based on the size of the transform block when the transform skip is not applied to the transform block. For example, information indicating the position of the last significant coefficient may be coded and decoded only when the width and height of the transform block are less than a predetermined threshold.

According to another example, the residual information may include coded_sub_block_flag indicating whether a subblock includes a last non-zero coefficient, and this coded_sub_block_flag is coded and decoded only when a transform skip is not applied to a transform block.

According to an example, coded_sub_block_flag may be coded and decoded based on the size of the transform block when the transform skip is not applied to the transform block. For example, coded_sub_block_flag may be coded and decoded only when the width and height of the transform block are less than a predetermined threshold.

In one embodiment, the residual information includes a parity level flag for parity of a transform coefficient level for the quantized transform coefficient and a first transform coefficient level flag for whether the transform coefficient level is greater than a first threshold. In one example, the parity level flag indicates par_level_flag, the first transform coefficient level flag indicates rem_abs_gt1_flag or abs_level_gtx_flag[n][0], and the second transform coefficient level flag indicates rem_abs_gt2_flag or abs_level_gtx_flag[n][1].

In an embodiment, the deriving of the residual information may include deriving a value of the parity level flag and a value of the first transform coefficient level flag based on the quantized transform coefficient, and decoding the first transform coefficient level and decoding the parity level flag.

In an embodiment, the decoding the first transform coefficient level flag may be performed prior to the decoding the parity level flag. For example, the decoding apparatus may perform decoding for rem_abs_gt1_flag or abs_level_gtx_flag[n][0] before decoding for par_level_flag.

In an embodiment, the residual information may include a significant coefficient flag indicating whether the quantized transform coefficient is a non-zero effective coefficient, and a second transform coefficient level flag indicating whether the transform coefficient level for the quantized transform coefficient is greater than a second threshold. In one example, the significant coefficient flag may be sig_coeff_flag.

The residual information may include a context syntax element coded based on a context, and the context syntax element may include the significant coefficient flag, the parity level flag, the first transform coefficient level flag, and the second transform coefficient level flag.

In an embodiment, the deriving the quantized transform coefficient may decode the context syntax element based on a context and based on a predetermined maximum value for the context syntax element.

In other words, a sum of the number of significant coefficient flags for quantized transform coefficients in the current block, the number of first transform coefficient level flags, the number of parity level flags, and the number of second transform coefficient level flags included in the residual information may be less than or equal to a predetermined maximum value.

This maximum value is the sum of the number of significant coefficient flags for quantized transform coefficients related to the current sub-block in the current block, the number of first transform coefficient level flags, the number of parity level flags, and the number of second transform coefficient level flags.

In an embodiment, the maximum value may be determined in units of transform blocks. The current block may be a sub-block within the transform block which is a transform unit, and encoding of the quantized transform coefficient is performed in sub-block units, and when encoding the quantized transform coefficient in sub-block units, the context syntax element among residual information may be decoded based on the maximum value determined in units of transform blocks.

In an embodiment, this threshold value may be determined based on the size of the current block (or a current sub-block within the current block). If the current block is a transform block, the threshold value may be determined based on the size of the transform block.

In an embodiment, when the sum of the number of the significant coefficient flags, the number of the first transform coefficient level flags, the number of the parity level flags, and the number of the second transform coefficient level flags derived based on a 0th quantized transform coefficient to an nth quantized transform coefficient determined by a coefficient scan order reaches the predetermined maximum value, then explicit signaling of a significant coefficient flag, a first transform coefficient level flag, a parity level flag, and a second transform coefficient level flag may be omitted for a (n+1)th quantized transform coefficient determined by the coefficient scan order, and a value of the (n+1)th quantized transform coefficient may be derived based on a value of coefficient level information included in the residual information.

For example, when the sum of the number of sig_coeff_flag, the number of rem_abs_gt1_flag (or abs_level_gtx_flag[n][0]), the number of par_level_flags, and the number of rem_abs_gt2_flag (or abs_level_gtx_flag[n][1]) derived based on the 0th quantized transform coefficient (or the first quantized transform coefficient) to the nth quantized transform coefficient (or the nth quantized transform coefficient) determined by the coefficient scan order reaches the predetermined maximum value, then explicit signaling of sig_coeff_flag, rem_abs_gt1_flag (or abs_level_gtx_flag[n][0]), par_level_flag, abs_level_gtx_flag[n][1] and rem_abs_gt2_flag (or abs_level_gtx_flag[n][1]) may be omitted for a (n+1)th quantized transform coefficient determined by the coefficient scan order, and a value of the (n+1)th quantized transform coefficient may be derived based on the value of abs_remainder or dec_abs_level included in the residual information.

In an embodiment, the significant coefficient flags, the first transform coefficient level flags, the parity level flags, and the second transform coefficient level flags included in the residual information may be context-based coded, and the coefficient level information may be bypass-based coded.

While in the above-described embodiments, the methods are described based on the flowchart having a series of steps or blocks, the present disclosure is not limited to the above-described order of the steps or blocks, and a certain step may occur simultaneously with other step or in a different order from that described above. Further, it may be understood by a person having ordinary skill in the art that the steps shown in a flowchart is not exhaustive, and that another step may be incorporated or one or more steps of the flowchart may be removed without affecting the scope of the present disclosure.

The foregoing methods according to the present disclosure may be implemented in a software form, and the encoding apparatus and/or decoding apparatus according to the disclosure may be included in an apparatus for performing image processing of, for example, a TV, a computer, a smartphone, a set-top box, and a display device.

When embodiments in the present disclosure are implemented in software, the above-described methods may be embodied as modules (processes, functions or the like) for performing the above-described functions. The modules may be stored in a memory and may be executed by a processor. The memory may be inside or outside the processor and may be connected to the processor in various well-known means. The processor may include an application-specific integrated circuit (ASIC), a different chipset, a logic circuit, and/or a data processor. The memory may include a read-only memory (ROM), a random access memory (RAM), a flash memory, a memory card, a storage medium, and/or another storage device. That is, embodiments described in the present disclosure may be embodied and performed on a processor, a microprocessor, a controller or a chip. For example, functional units shown in each drawing may be embodied and performed on a computer, a processor, a microprocessor, a controller or a chip. In this case, information (e.g., information on instructions) or algorithm for embodiment may be stored in a digital storage medium.

Further, the decoding apparatus and the encoding apparatus to which the present disclosure is applied may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an internet streaming service providing device, a three-dimensional (3D) video device, a virtual reality device, an augmented reality (argumente reality) device, a video telephony video device, a transportation means terminal (e.g., a vehicle (including an autonomous vehicle) terminal, an aircraft terminal, a ship terminal, etc.) and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied may be produced in the form of a program executed by a computer, and be stored in a computer-readable recording medium. Multimedia data having a data structure according to the present disclosure may be also stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network.

Additionally, the embodiments of the present disclosure may be embodied as a computer program product by program codes, and the program codes may be performed in a computer by the embodiment of the disclosure. The program codes may be stored on a computer-readable carrier.

Figure 19:
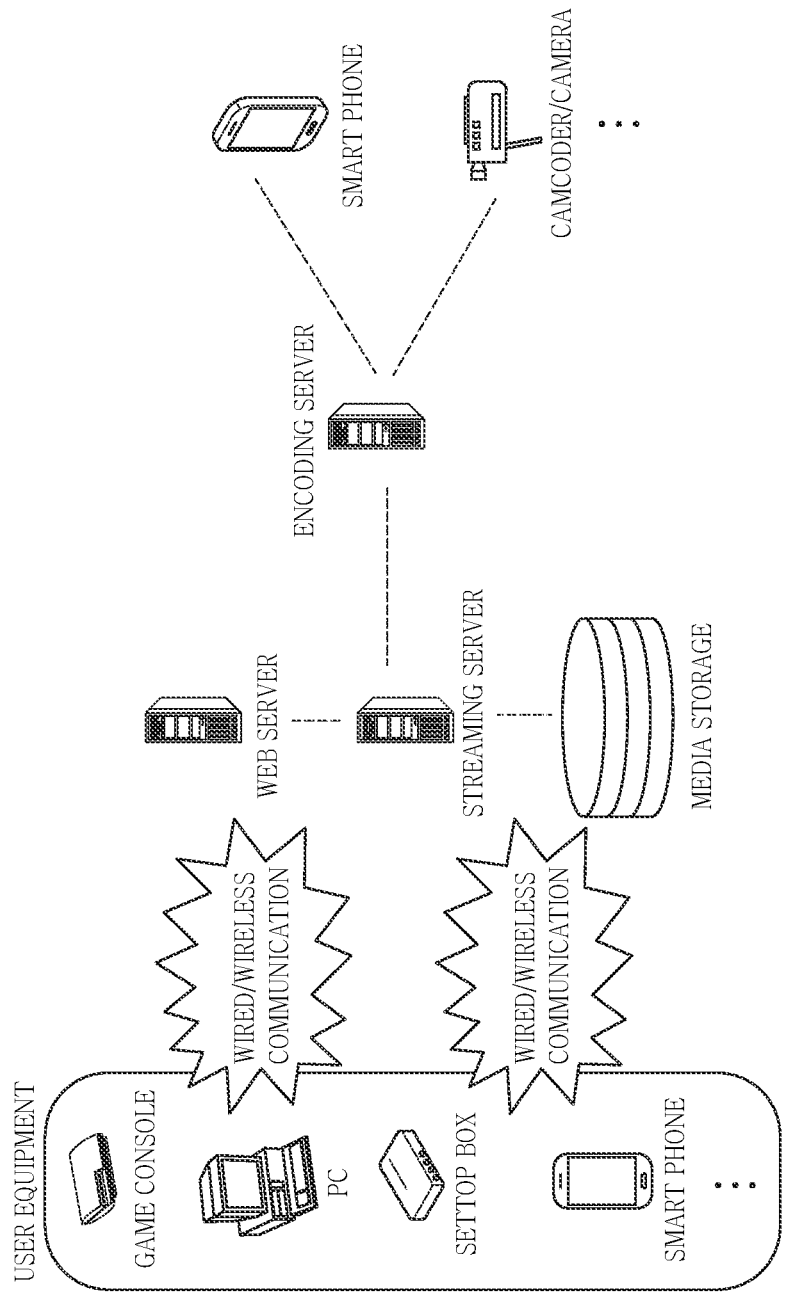
FIG. 19 illustratively represents a content streaming system structure diagram to which the present disclosure may be applied.

FIG. 19 represents an example of a contents streaming system to which the present document may be applied.

Referring to FIG. 19, the content streaming system to which the present document is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

What is claimed is:

1. An image decoding method performed by a decoding apparatus,
   the method comprising:
   receiving a bitstream including residual information;
   deriving a quantized transform coefficient for a current block based on the residual information included in the bitstream;
   deriving a residual sample for the current block based on the quantized transform coefficient; and
   generating a reconstructed picture based on the residual sample for the current block, wherein the residual information includes position information related to the position of a last non-zero transform coefficient in a transform block,
   wherein the position information is parsed based on a value of a transform skip flag related to whether a transform skip is applied to the transform block being equal to 0 and a size of the transform block being equal to or more than a certain value, and
   wherein parsing of the position information is skipped based on the value of the transform skip flag being equal to 1.

2. The image decoding method of claim 1, wherein the position information includes information related to a prefix of the column position of the last significant coefficient in the scanning order in the transform block, and information related to a prefix of the row position of the last significant coefficient in the scanning order in the transform block, and information related to a suffix of the column position of the last significant coefficient in the scanning order in the transform block, and information related to a suffix of the row position of the last significant coefficient in the scanning order in the transform block.

3. The image decoding method of claim 1, wherein the residual information includes a significant coefficient flag related to whether or not the quantized transform coefficient is a non-zero significant coefficient, a parity level flag for a parity of a transform coefficient level for the quantized transform coefficient, a first transform coefficient level flag related to whether or not the transform coefficient level is greater than a first threshold value, and a second transform coefficient level flag related to whether or not the transform coefficient level for the quantized transform coefficient is greater than a second threshold value, and
   wherein the deriving the quantized transform coefficient comprises:
   decoding the first transform coefficient level flag, and decoding the parity level flag; and
   deriving the quantized transform coefficient based on a value of the decoded parity level flag and a value of the decoded first transform coefficient level flag,
   wherein the decoding of the first transform coefficient level flag is performed prior to the decoding of the parity level flag.

4. An image encoding method performed by an encoding apparatus, the method comprising:
   deriving a residual sample for a current block;
   deriving a quantized transform coefficient based on the residual sample for the current block; and encoding residual information including information on the quantized transform coefficient, wherein the residual information includes position information related to the position of a last non-zero transform coefficient in a transform block, wherein the position information is encoded based on a value of a transform skip flag related to whether a transform skip is applied to the transform block being equal to 0 and a size of the transform block being equal to or more than a certain value, and wherein encoding of the position information is skipped based on the value of the transform skip flag being equal to 1.

5. The image encoding method of claim 4, wherein the position information includes information related to a prefix of the column position of the last significant coefficient in the scanning order in the transform block, and information related to a prefix of the row position of the last significant coefficient in the scanning order in the transform block, and information related to a suffix of the column position of the last significant coefficient in the scanning order in the transform block, and information related to a suffix of the row position of the last significant coefficient in the scanning order in the transform block.

6. The image encoding method of claim 4, wherein the residual information includes a significant coefficient flag related to whether or not the quantized transform coefficient is a non-zero significant coefficient, a parity level flag for a parity of a transform coefficient level for the quantized transform coefficient, a first transform coefficient level flag related to whether or not the transform coefficient level is greater than a first threshold value, and a second transform coefficient level flag related to whether or not the transform coefficient level for the quantized transform coefficient is greater than a second threshold value, and wherein the deriving the quantized transform coefficient comprises:

encoding the first transform coefficient level flag, and encoding the parity level flag; and deriving the quantized transform coefficient based on a value of the encoded parity level flag and a value of the encoded first transform coefficient level flag, wherein the encoding of the first transform coefficient level flag is performed prior to the encoding of the parity level flag.

7. A non-transitory computer-readable storage medium storing a bitstream generated by the image encoding method of claim 4.

8. A transmitting method of data for an image, the method comprising:

obtaining a bitstream for the image, wherein the bitstream is generated based on deriving a residual sample for a current block, deriving a quantized transform coefficient based on the residual sample for the current block, and encoding residual information including information on the quantized transform coefficient to generate the bitstream; and transmitting the data comprising the bitstream, wherein the residual information includes position information related to the position of a last non-zero transform coefficient in a transform block, wherein the position information encoded based on a value of a transform skip flag related to whether a transform skip is applied to the transform block being equal to 0 and a size of the transform block being equal to or more than a certain value, and wherein encoding of the position information is skipped based on the value of the transform skip flag being equal to 1.

* * * * *